(12) United States Patent
Suzuki et al.

(10) Patent No.: US 10,984,053 B2
(45) Date of Patent: Apr. 20, 2021

(54) OPERATION ASSISTANCE SYSTEM AND METHOD

(71) Applicant: Hitachi, Ltd., Tokyo (JP)

(72) Inventors: Katsunori Suzuki, Tokyo (JP); Mineyoshi Masuda, Tokyo (JP); Kiyomi Wada, Tokyo (JP); Hironori Emaru, Tokyo (JP)

(73) Assignee: HITACHI, LTD., Tokyo (JP)

( * ) Notice: Subject to any disclaimer, the term of this patent is extended or adjusted under 35 U.S.C. 154(b) by 151 days.

(21) Appl. No.: 16/328,600

(22) PCT Filed: Jun. 5, 2017

(86) PCT No.: PCT/JP2017/020758
§ 371 (c)(1),
(2) Date: Feb. 26, 2019

(87) PCT Pub. No.: WO2018/225115
PCT Pub. Date: Dec. 13, 2018

(65) Prior Publication Data
US 2020/0057973 A1    Feb. 20, 2020

(51) Int. Cl.
| | |
|---|---|
| G06F 16/904 | (2019.01) |
| G06F 16/903 | (2019.01) |
| G06N 5/02 | (2006.01) |
| G06Q 10/06 | (2012.01) |
| G06Q 10/10 | (2012.01) |
| G06F 8/41 | (2018.01) |
| H04L 29/06 | (2006.01) |

(52) U.S. Cl.
CPC ........ *G06F 16/90335* (2019.01); *G06F 8/456* (2013.01); *G06F 16/904* (2019.01); *G06N 5/025* (2013.01); *G06Q 10/06316* (2013.01); *G06Q 10/063112* (2013.01); *G06Q 10/105* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 5,966,409 | A * | 10/1999 | Maeda | H04L 7/0008 370/513 |
| 6,671,818 | B1 * | 12/2003 | Mikurak | G06Q 10/06 714/4.21 |
| 6,807,575 | B1 * | 10/2004 | Emaru | G06F 11/3419 709/203 |
| 7,130,807 | B1 * | 10/2006 | Mikurak | G06Q 10/06 705/7.25 |
| 7,277,875 | B2 | 10/2007 | Serrano-Morales et al. | |
| 7,716,077 | B1 * | 5/2010 | Mikurak | G06Q 10/06 705/7.12 |

(Continued)

*Primary Examiner* — Gurkanwaljit Singh
(74) *Attorney, Agent, or Firm* — Procopio, Cory, Hargreaves & Savitch LLP

(57) ABSTRACT

An operation assistance system receives selection of a first procedure in a procedure manual including a plurality of procedures relating to an operation of an operation target. The operation assistance system displays an estimation structure obtained by structuring at least part of the first procedure based on an abstraction structure obtained by structuring a second abstraction procedure included in a first abstraction procedure corresponding to the first procedure and the selected first procedure.

10 Claims, 22 Drawing Sheets

(56) References Cited

U.S. PATENT DOCUMENTS

| | | | | |
|---|---|---|---|---|
| 8,046,769 B2* | 10/2011 | Masuda | ............... | G06F 11/3495 718/105 |
| 2004/0107278 A1* | 6/2004 | Emaru | ................ | G06F 11/3034 709/224 |
| 2004/0177143 A1* | 9/2004 | Maciel | ................... | H04L 41/22 709/224 |
| 2005/0038890 A1* | 2/2005 | Masuda | .............. | H04L 67/1023 709/224 |
| 2006/0129419 A1* | 6/2006 | Flaxer | ............. | G06Q 10/06375 705/7.37 |
| 2009/0138415 A1* | 5/2009 | Lancaster | ................ | G06N 5/04 706/11 |
| 2010/0199257 A1* | 8/2010 | Biggerstaff | ............ | G06F 8/456 717/104 |
| 2011/0167105 A1* | 7/2011 | Ramakrishnan | ....... | G06Q 10/10 709/203 |
| 2013/0066677 A1* | 3/2013 | Killoh | ................ | G06Q 30/0277 705/7.29 |
| 2014/0207944 A1* | 7/2014 | Emaru | ................... | H04L 47/78 709/224 |
| 2014/0257935 A1* | 9/2014 | Killoh | ................ | G06Q 30/0283 705/7.35 |
| 2016/0127539 A1* | 5/2016 | Sharma | ................ | H04M 15/08 379/112.09 |
| 2016/0171399 A1* | 6/2016 | Santhanam | ...... | G06Q 10/06316 705/7.36 |

\* cited by examiner

FIG. 4

PROCEDURE MANUAL
1501

| PROCEDURE ID (15010) | PROCEDURE (15011) |
|---|---|
| 1 | |

FIG. 5

PROCEDURE TABLE
1502

| PROCEDURE ID (15010) | PROCEDURE STATEMENT ID (15021) | WORD (15022) | CONDITION TYPE ID (15023) | ACTION ID (15024) | ABSTRACTION PROCEDURE ID (15025) | ABSTRACTION PROCEDURE STATEMENT ID (15026) |
|---|---|---|---|---|---|---|
| 1 | 1 | | | | | |
| 1 | 1 | | | | | |
| 1 | 1 | | | | | |
| 1 | 2 | | | | | |
| 1 | 2 | | | | | |

FIG. 6

CONVERSION ORDER TABLE
1503

| CONVERSION ORDER (15030) | PROCEDURE ID (15031) |
|---|---|
| 1 | |

FIG. 7

EVENT TABLE
1601

| EVENT ID | SERVER NAME | TIME | IMPORTANCE | MESSAGE |
|---|---|---|---|---|
| 1 | | | | |

CONDITION TYPE TABLE
1510

| CONDITION TYPE ID | CONDITION TYPE | CONDITION VALUE | ACQUISITION SOURCE TABLE | ACQUISITION SOURCE COLUMN | ESTIMATION FLAG | FLOW ID |
|---|---|---|---|---|---|---|
| 1 | SERVER_NAME_COND_1 | - | EVENT TABLE | SERVER NAME | No | |
| 2 | SEVERITY_COND_1 | - | EVENT TABLE | IMPORTANCE | Yes | |
| 3 | MSG_COND_1 | - | EVENT TABLE | MESSAGE | No | |
| 4 | TIME_COND_1 | "[0-9]*TIME TO [0-9]*TIME" | EVENT TABLE | TIME | No | |

ACTION TABLE
1511

| ACTION ID | ACTION TYPE | ACTION EXPRESSION | FLOW ID |
|---|---|---|---|
| 1 | ESCALATION | ESCALATION IS PERFORMED | |
| 2 | NO_ESCALATION | ESCALATION IS NOT PERFORMED | |
| 3 | RESTART_SERVER | RESTART | |

ABSTRACTION PROCEDURE TABLE
1504

| ABSTRACTION PROCEDURE ID 15040 | ABSTRACTION PROCEDURE STATEMENT ID 15041 | WORD 15042 | CONDITION TYPE ID 15043 | ACTION ID 15044 |
|---|---|---|---|---|
| 1 | | | | |

FIG. 11

ABSTRACTION PROCEDURE RELATIONSHIP TABLE
1505

| ABSTRACTION PROCEDURE ID 15050 | CHILD ABSTRACTION PROCEDURE ID 15051 | PARENT ABSTRACTION PROCEDURE ID 15052 |
|---|---|---|
| 1 | | |

FIG. 12

ABSTRACTION PROCEDURE PATTERN TABLE
1506

| PHRASE ID 15060 | PHRASE 15061 |
|---|---|
| | |

FIG. 13

ABSTRACTION PROCEDURE IDENTICAL PART TABLE
1507

| ABSTRACTION PROCEDURE ID (15070) | ABSTRACTION PROCEDURE STATEMENT ID (15071) | START POSITION (15072) | END POSITION (15073) | PHRASE ID (15074) |
|---|---|---|---|---|
| 1 | | | | |

FIG. 14

FLOW TABLE
1508

| FLOW ID (15080) | LOGICAL EXPRESSION (15081) |
|---|---|
| 1 | SERVER_NAME_COND == AAA and [FLOW ID = 2] |
| 2 | IF ( TIME_COND > 12:00 and TIME_COND < 12:30 and MESSAGECOND == XXX ) Then "No Escalation" |

FIG. 15

PROCEDURE FLOW CORRESPONDENCE TABLE
1509

| PROCEDURE ID (15090) | PROCEDURE STATEMENT ID (15091) | ABSTRACTION PROCEDURE ID (15092) | ABSTRACTION PROCEDURE STATEMENT ID (15093) | START POSITION (15094) | END POSITION (15095) | PROCEDURE PATTERN ID (15096) | FLOW ID (15097) | REPRESENTATIVE FLAG (15098) |
|---|---|---|---|---|---|---|---|---|
| 1 | | 1 | | | | | | |

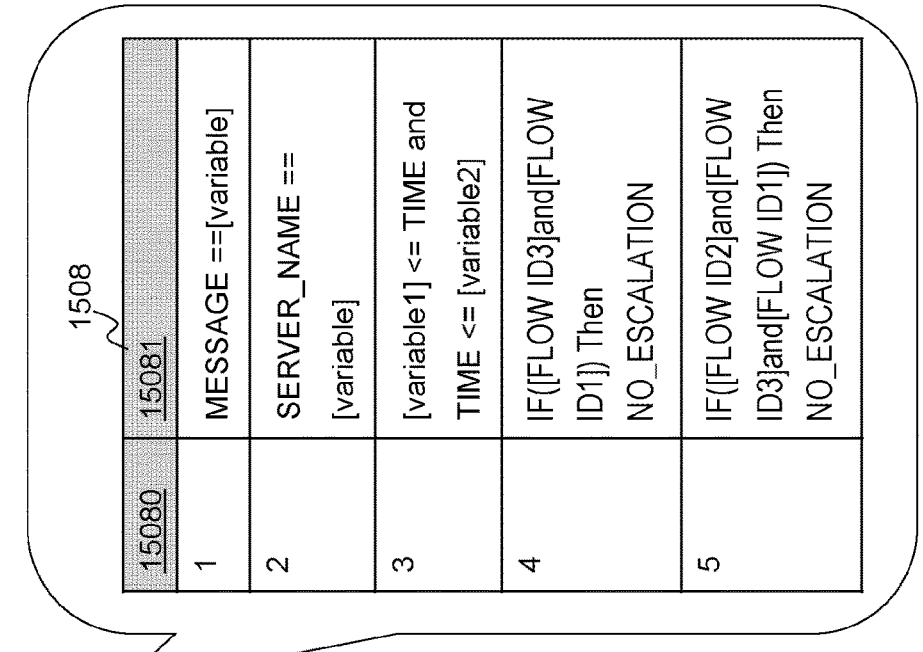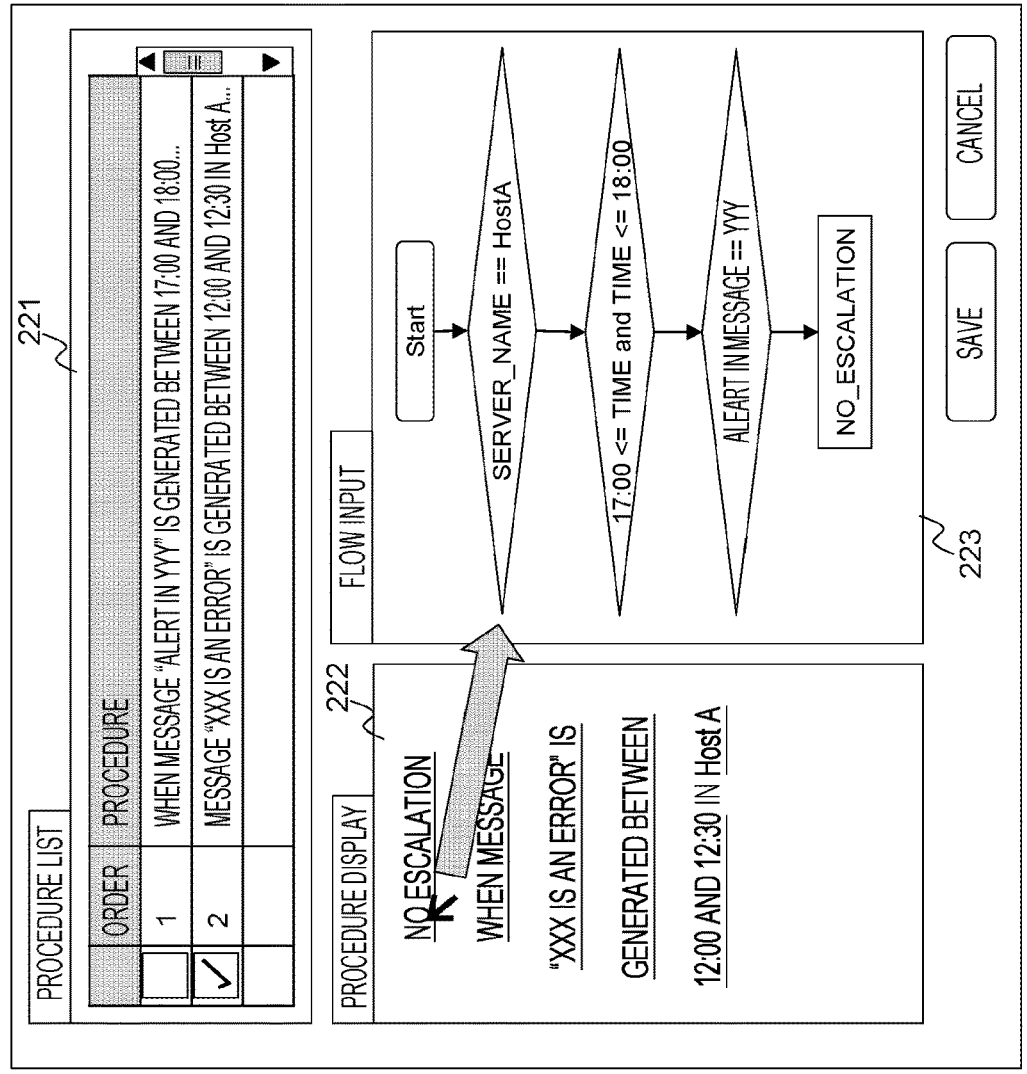
FIG. 32

OPERATION ASSISTANCE SYSTEM AND METHOD

CROSS-REFERENCE TO RELATED APPLICATIONS

This application is a U.S. National Stage entry of PCT Application No: PCT/JP2017/020758 filed Jun. 5, 2017, the contents of which are incorporated herein by reference.

TECHNICAL FIELD

The present invention relates generally to techniques for assistance of an operation of a target such as a computer system, an application, and service.

BACKGROUND ART

An example of operation targets is a computer system. In an operation of the computer system, a performance value such as a response time and a condition such as a downtime are defined in advance to perform the operation to satisfy this condition in many cases.

Thus, it is necessary to deal with an abnormal state promptly, but it is difficult to anticipate a timing at which the abnormal state occurs. Further, it is not practical to constantly monitor a large amount of system resource states such as a server individually. Thus, an event is issued by being triggered by a specific state of the computer system such as a timing when the performance value falls below a threshold and a timing when an error is output to a log. An operation manager can grasp the state of the computer system by monitoring the event, and promptly detect an abnormality.

Meanwhile, knowledge on an information technology and knowledge on a computer system as the operation target are necessary in order to properly deal with a content of the abnormality and a place where the abnormality has occurred so that an advanced skill set is required. Human resources with such advanced skill sets are rare, and it is difficult to secure the number of people sufficient for monitoring the event and safely operating the computer system.

Thus, a system in which a human resource having an advanced skill set (hereinafter referred to as an operation manager) prepares a procedure manual, which describes which countermeasure that needs to be taken when which event having which content occurs under which condition, and a human resource having an insufficient skill set (hereinafter referred to as an operator) monitors the computer system based on the procedure manual is generally adopted. This system is adoptable because the computer system as the operation target is a system which is strictly designed and developed on the design and expansion of the scale of the system is slow.

In recent years, however, it is possible to procure physical system resources flexibly and promptly due to cloud computing, and the expansion of the scale of the computer system has been accelerated. Meanwhile, the operation of logical system resources such as a virtual server and an application has a problem such as confidentiality of data, and generally, is hardly delegated to a provider of the cloud computing. In the above-described operation system, the operation of the computer system depends on the procedure manual and the operator, and thus, the operation becomes a bottleneck against the expansion of the scale of the computer system.

Therefore, it is desirable to reduce an operational load. In order to reduce the operational load, it is conceivable to use a technique disclosed in PTL 1. PTL 1 discloses a flow editing technique. The flow editing technique is a technique of inputting a logical expression in the format of a flowchart. According to PTL 1, it is possible to reduce a description amount when describing the flowchart based on a template of the flowchart.

CITATION LIST

Patent Literature

PTL 1: U.S. Pat. No. 7,277,875 A

SUMMARY OF INVENTION

Technical Problem

In general, a large amount of procedures is accumulated in a procedure manual. In the above-described PTL 1, it is necessary to form a template of a flowchart or search out a template to be applied for each procedure, and then, input a value. Therefore, it is difficult to substantially reduce a burden to convert a procedure into a flowchart.

It is necessary to understand a description content of a procedure in order to convert the procedure into a flowchart, and a person preparing the procedure manual is usually the operation manager as described above. Therefore, it is difficult for a person other than the operation manager to convert a procedure into a flowchart. However, the operation manager is generally small in number with respect to the scale of the computer system as the operation target, and thus, an operational load is concentrated on the operation manager. For this reason, it is difficult to contrive large man-hours, such as conversion of a procedure into a flowchart for each procedure, from the operation manager.

Incidentally, the procedure manual is written using a natural language. When the procedure manual itself is edited to be easily converted into the format that the machine can read (understand), it is possible to expect automatic conversion of a procedure into a flowchart. However, the procedure manual includes a procedure regarding operational know-how in some cases, and thus, it is desirable to avoid editing the procedure manual itself.

The above-described problem may occur in a case where the operation target is a target other than the computer system. Further, the problem may also occur in a case where a structure after conversion of the procedure expressed in the natural language is a structure other than the flowchart.

Solution to Problem

An operation assistance system receives selection of a first procedure in a procedure manual including a plurality of procedures relating to an operation of an operation target. The operation assistance system displays an estimation structure obtained by structuring at least part of the first procedure based on an abstraction structure obtained by structuring a second abstraction procedure included in a first abstraction procedure corresponding to the first procedure and the selected first procedure.

Advantageous Effects of Invention

According to the present invention, it is possible to reduce the burden of input work to convert the procedure manual into a format that the machine can read.

BRIEF DESCRIPTION OF DRAWINGS

FIG. 4 illustrates an example of a procedure manual according to the embodiment.
FIG. 5 illustrates an example of a procedure table according to the embodiment.
FIG. 6 illustrates an example of a conversion order table according to the embodiment.
FIG. 7 illustrates an example of event information according to the embodiment.
FIG. 8 illustrates an example of a condition type table according to the embodiment.
FIG. 9 illustrates an example of an action table according to the embodiment.
FIG. 10 illustrates an example of an abstraction procedure table according to the embodiment.
FIG. 11 illustrates an example of an abstraction procedure relationship table according to the embodiment.
FIG. 12 illustrates an example of an abstraction procedure pattern table according to the embodiment.
FIG. 13 illustrates an example of an abstraction procedure identical part table according to the embodiment.
FIG. 14 illustrates an example of a flow table according to the embodiment.
FIG. 15 illustrates an example of a procedure flow correspondence table according to the embodiment.
FIG. 32 illustrates a fourth part of the transition example of the flow editor screen according to the embodiment.

DESCRIPTION OF EMBODIMENTS

Figure 1:
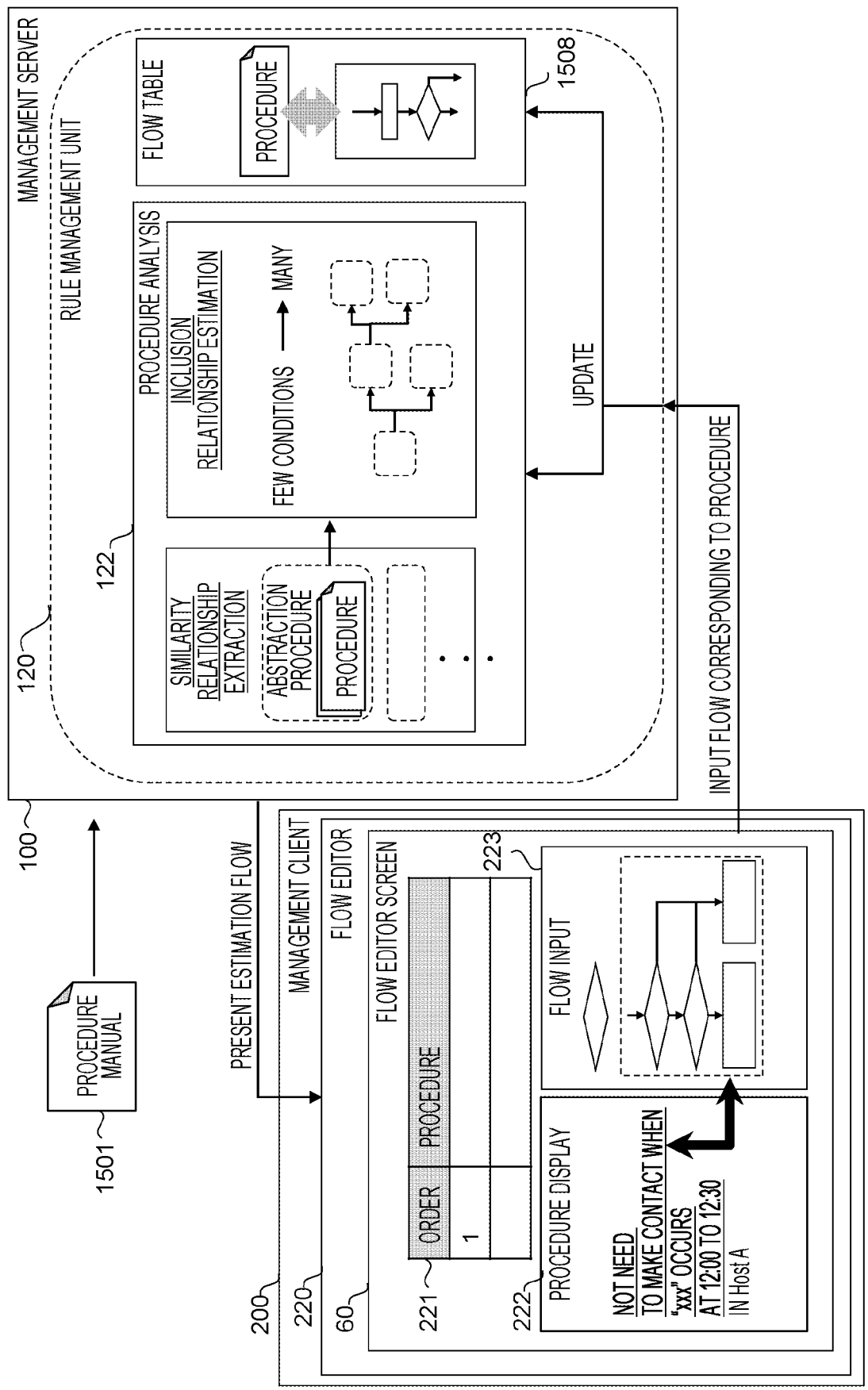
FIG. 1 illustrates an overview of an embodiment.

An embodiment will be described with reference to the drawings. Incidentally, the embodiment to be described hereinafter does not limit the invention according to the claims, and further, all of the elements described in the embodiment and combinations thereof are not necessarily indispensable for the solution of the invention.

Incidentally, various types of information will be sometimes described with an expression of an "aaa table" in the following description, but the various types of information may be expressed with a data structure other than the table. In order to indicate that the information is not dependent on the data structure, "aaa table" can be called "aaa information".

Further, an "interface unit" may include one or more interface devices, specifically, at least one of a user interface unit and a communication interface unit in the following description. The user interface unit may include at least one I/O device among one or more I/O devices (for example, an input device (for example, a keyboard and a pointing device) and an output device (for example, a display device) and a display computer. The communication interface unit may include one or more communication interface devices. The one or more communication interface devices may be one or more homogeneous communication interface devices (for example, one or more network interface cards (NICs)), or may be two or more heterogeneous communication interface devices (for example, NIC and a host bus adapter (HBA)).

Further, a "storage unit" includes one or more memories in the following description. At least one memory regarding the storage unit may be a volatile memory. The storage unit is mainly used during processing by a processor unit.

Further, the "processor unit" includes one or more processors in the following description. At least one processor is typically a microprocessor such as a central processing unit (CPU). Each of the one or more processors may be a single-core or multi-core processor. The processor may include a hardware circuit that performs a part or whole of the processing. The processor unit may include a hardware circuit that performs some or all of processes (for example, a field-programmable gate array (FPGA) or an application specific integrated circuit (ASIC)).

Further, a "management system" is an example of an operation assistance system and may be constituted by one or more computers in the following description. Specifically, for example, when a management computer has a display device and the management computer displays information on its own display device, the management computer may be the management system. Further, for example, when the management computer (for example, a server) transmits display information to a remote display computer (for example, a client) and the display computer displays the information (when the management computer displays the information on the display computer), a system including at least the management computer between the management computer and the display computer may be the management system. The management system may include the interface unit, the storage unit, and the processor unit to which the interface unit and the storage unit are connected. To "display the display information" by the computer in the management system may be to display the display information on the display device of the computer or to transmit the display information to the display computer from the computer (in the latter case, the display information is displayed by the display computer).

In the following description, a function is sometimes described with an expression of a "kkk unit" (excluding the interface unit, the storage unit, and the processor unit), but the function may be implemented when one or more computer programs are executed by the processor unit or may be implemented by one or more hardware circuits (for example, FPGAs or ASICs). In the case where the function is implemented by the processor unit executing the program, a predetermined process is performed appropriately using the storage unit and/or the interface unit, and thus, the function may be configured as at least a part of the processor unit. A process described with the function as a subject may be a process performed by the processor unit or an apparatus having the processor unit. The program may be installed from a program source. The program source may be, for example, a program distribution computer or a recording medium (for example, a non-transitory recording medium) readable by a computer. The description of each function is an example, a plurality of functions may be integrated into one function or one function may be divided into a plurality of functions.

Further, a "procedure" is constituted by one or more procedure statements, and includes a countermeasure content to be taken against a system error (for example, an operator performs escalation to an operation manager) and a condition for a determination to implement the countermeasure content (for example, a name of a host having issued an event and a time zone when the event has been issued) in the following description. The "procedure statement" is a natural sentence in the procedure. "Procedure manual" is a document describing a plurality of procedures. The procedure manual may be saved in the format of, for example, an electronic file.

Further, a "flowchart" is used to simplify the description as a representative logical expression example which is a format that a machine can read (understand) regarding a structure after conversion of the procedure, in the following description. In the present invention, the format of the structure after the procedure conversion may be any format as long as the format can be described by a human and can express a logical structure, and may be an expression format (a tree structure expression, a logical formula expression, a table structure expression, an if-then rule expression, or the like) other than the flowchart.

Further, the operation target is a target system (computer system) in the following description, but may be a target other than the computer system, for example, an application, service, or a device in the present invention.

(1-1) Overview of Embodiment

FIG. 1 illustrates an overview of the present embodiment.

The management system is a system including a management server 100 and a management client 200.

The management server 100 includes a rule management unit 120. The rule management unit 120 can refer to a flow table 1508. The flow table 1508 holds information on the flowchart.

The management client 200 executes a flow editor 220 which is an example of a computer program (for example, an application program). The flow editor 220 displays a flow editor screen 60. The flow editor screen 60 is a screen displayed on the management client 200 by the flow editor (not illustrated) in the management server 100. The flow editor screen 60 is a graphical user interface (GUI) in the present embodiment, but it is not limited to the GUI.

The overview of the present embodiment will be described with reference to FIG. 1.

First, the rule management unit 120 executes a procedure analysis process 1201 in the management server 100. The procedure analysis process 1201 includes a process of reading a procedure manual 1501 and a process of specifying a relationship between procedures in the procedure manual 1501. The procedure manual 1501 includes a plurality of procedures regarding operations of the operation target. The process of specifying the relationship between the procedures includes a similarity relationship extraction process which is grouping of procedures having similar expressions and an inclusion relationship estimation process which is a process of specifying a procedure to be used as a constituent element of another procedure. The rule management unit 120 holds information on the relationship between the procedures obtained by the procedure analysis process 1201.

Thereafter, the operation manager describes (inputs) a flowchart corresponding to a procedure in the flow editor 220 on the management client 200, for example. In the present embodiment, the flow editor screen 60 has display areas such as a procedure list 221, a procedure display 222, and a flow input 223. In the procedure list 221, a list of procedures is displayed. The operation manager selects a procedure from the procedure list 221 and starts to input the flowchart. The order of the procedures in the procedure list 221 is, for example, the order that enables a burden of flowchart input work performed by the operation manager to be minimized, specifically, the order having small words included in an abstraction procedure. The "abstraction procedure" means an abstracted procedure of a procedure in the procedure manual 1501. A "word" in the abstraction procedure is a constituent element of the abstraction procedure and is, for example, an expression of a conditional clause to be described below in the abstraction procedure or a countermeasure content.

When the operation manager selects a procedure from the procedure list 221, contents (details) of the selected procedure are displayed on the procedure display 222. The operation manager inputs a flowchart corresponding to the contents to the flow input 223. Incidentally, if the selected procedure is similar to a procedure corresponding to a flowchart that has been already input (for example, when a similarity degree to be described later is equal to or greater than a threshold), the rule management unit 120 provides the input flowchart (or a flowchart obtained by substituting a parameter in the flowchart with a parameter value specified from the selected procedure) to the flow editor 220 as an estimated flowchart, and the flow editor 220 displays the estimated flowchart in the flow input 223.

Accordingly, it is difficult for the rule management unit 120 to display the estimated flowchart when there is no flowchart input in the past because there is no information necessary for estimation of the flowchart. Thus, the operation manager inputs the flowchart to the flow editor 220 based on the selected procedure and issues a save instruction. When receiving the save instruction, the flow editor 220 transmits a procedure (or a procedure ID) and a flowchart to the management server 100. The rule management unit 120 of the management server 100 receives the flowchart and procedure, and registers information on the flowchart associated with the procedure in the flow table 1508. Regarding a procedure similar to the received procedure (for example, a procedure that uses the received procedure itself as a constituent element), the rule management unit 120 estimates a part or whole of a flowchart corresponding to the similar procedure based on the information on the relationship between procedures and the received flowchart.

Next, it is assumed that the operation manager has selected another procedure (hereinafter referred to as a second procedure in this paragraph) similar to a previously selected procedure (hereinafter referred to as a first procedure in this paragraph) on the flow editor screen 60. In this case, there is a possibility that a part or whole of the flowchart corresponding to the second procedure has been estimated based on the previously saved flowchart (a flowchart corresponding to the first procedure). If there is such an estimated flowchart, the estimated flowchart is displayed in association with a whole or part of the second procedure corresponding to the estimated flowchart by the flow editor 220 and the rule management unit 120 (for example, when a procedure statement that is a whole or part of the second procedure is selected by the operation manager, an estimated flowchart corresponding to the procedure statement is highlighted). The operation manager performs editing of the estimated flowchart (for example, correction or addition of a logical expression) to input (complete) the flowchart corresponding to the second procedure to the flow editor 220 and issues the save instruction.

The management server 100 (the rule management unit 120) can learn a correspondence between the procedure and the flowchart and improve estimation accuracy of the flowchart by repeating the above processing (that is, by repeating a set of reception of the selection of the procedure and reception of the input (edit) of the flowchart).

As will be described later, the rule management unit 120 can perform the following processing. For example, for a plurality of procedures constituting the procedure manual 1501, the rule management unit 120 substitutes each of condition types or countermeasure contents (action types) of the same type regarding the conditional clauses and the countermeasure contents included in those procedures, with a parameter (parameter item), and obtains a plurality of abstraction procedures. Each abstraction procedure is a common pattern extracted from one or more procedures that are in a similarity relationship. The rule management unit 120 performs hierarchical clustering for a plurality of abstraction procedures to specify a similarity relationship between abstraction procedures. Then, the rule management unit 120 estimates an inclusion relationship between abstraction procedures based on the specified similarity relationship and an inclusion relationship of a type (condition type) of a conditional clause included in each abstraction procedure. When a logical expression corresponding to an arbitrary procedure is given (for example, when inputted from the operation manager), the rule management unit 120 estimates a logical expression corresponding to another procedure relating to the given procedure based on a relationship between a procedure and an abstraction procedure and an inclusion relationship between abstraction procedures. Further, the rule management unit 120 displays an estimated portion of the other procedure and other portions to be distinguished from each other.

Hereinafter, the present embodiment will be described in detail.

(1-2) Overall System Configuration

Figure 2:
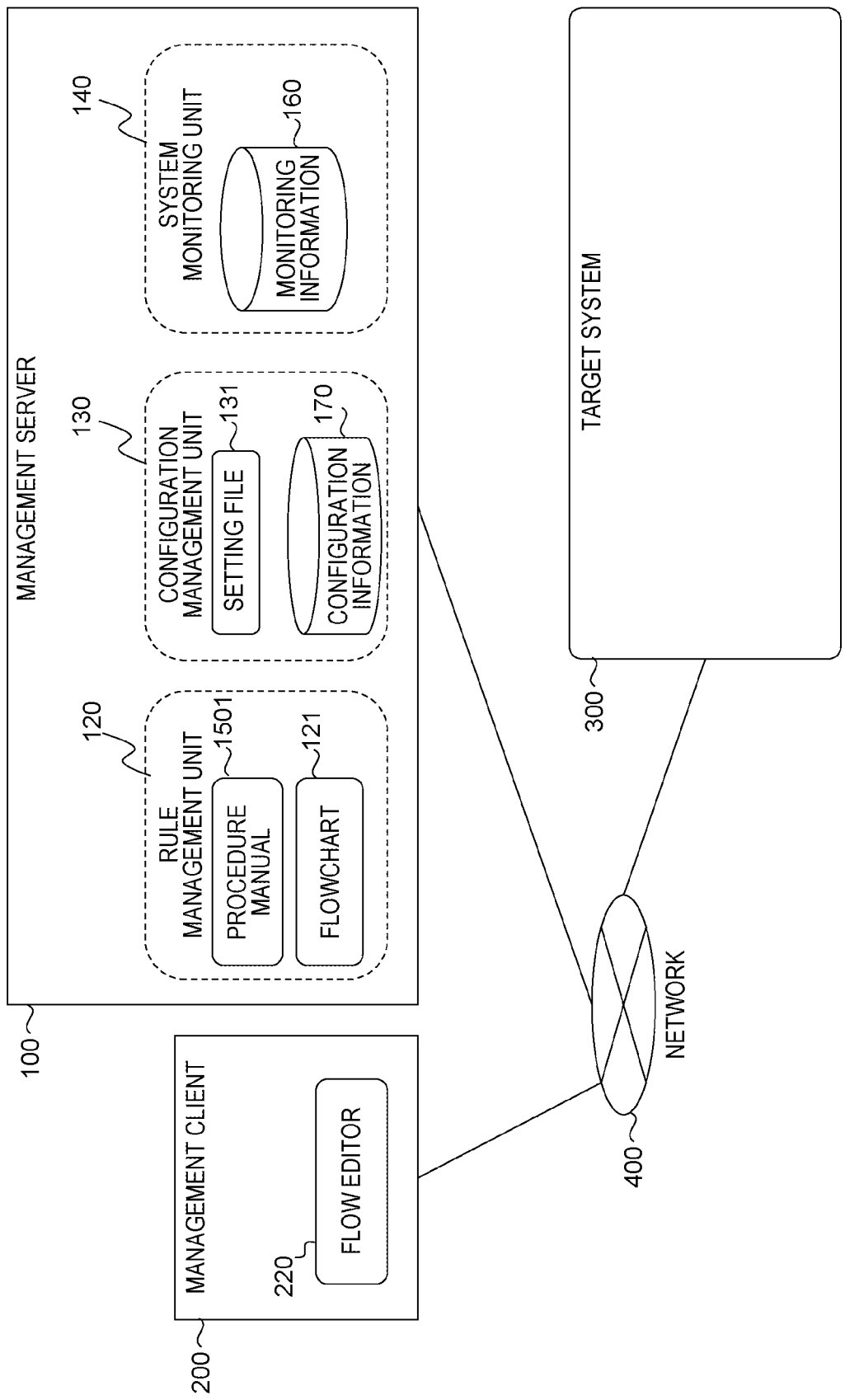
FIG. 2 illustrates an overall system configuration according to the embodiment.

FIG. 2 illustrates an overall system configuration according to the embodiment.

The management server 100, the management client 200, and a target system 300 are connected to a network 400, for example, a local area network (LAN).

The management server 100 includes the rule management unit 120 managing the procedure manual 1501 and a flowchart 121, a configuration management unit 130 managing a configuration of the target system 300, and a system monitoring unit 140 monitoring the target system 300. Incidentally, the rule management unit 120, the configuration management unit 130, and the system monitoring unit 140 may be arranged in independent computers, respectively, and do not limit the configuration.

The configuration management unit 130 manages a setting file 131 and configuration information 170. The setting file 131 may be, for example, a configuration file of an application or service, may be a definition file of a server automatic configuration tool that automatically generates the configuration of the management server 100 and a configuration file of an application, or may be a definition file defining a configuration of a virtual machine (VM) or a container. Further, the configuration information 170 includes, for example, server configuration information indicating the configuration of the management server 100.

The system monitoring unit 140 monitors the target system 300 (for example, collects various types of information from the target system 300) and updates monitoring information 160 including information on a monitoring result. The monitoring information 160 includes, for example, event information including an event issued by the target system 300, performance information including information indicating performance of each element of the target system 300, and log information including a log relating to the target system 300.

The management client 200 is a computer including an interface unit, a storage unit, and a processor unit, and, for example, has a display, a keyboard, and a pointer device and executes an application such as the flow editor 220. Incidentally, the flow editor 220 may be executed by the management server 100 instead of the management client 200, and a web browser of the management client 200 may display the flow editor screen 60 from the flow editor 220. Incidentally, a plurality of the management clients 200 may exist. Further, the management client 200 may be formed integrally with the management server 100 (for example, a standalone machine including both the management server 100 and the management client 200 may be an example of the management system).

The target system 300 is an example of the operation target, and is a monitoring target system of the operation manager or the operator (a computer system as an operation management target). For example, the target system 300 includes physical system resources such as a server, a storage, and a network and logical system resources such as a VM, a container, an application, and service.

Figure 3:
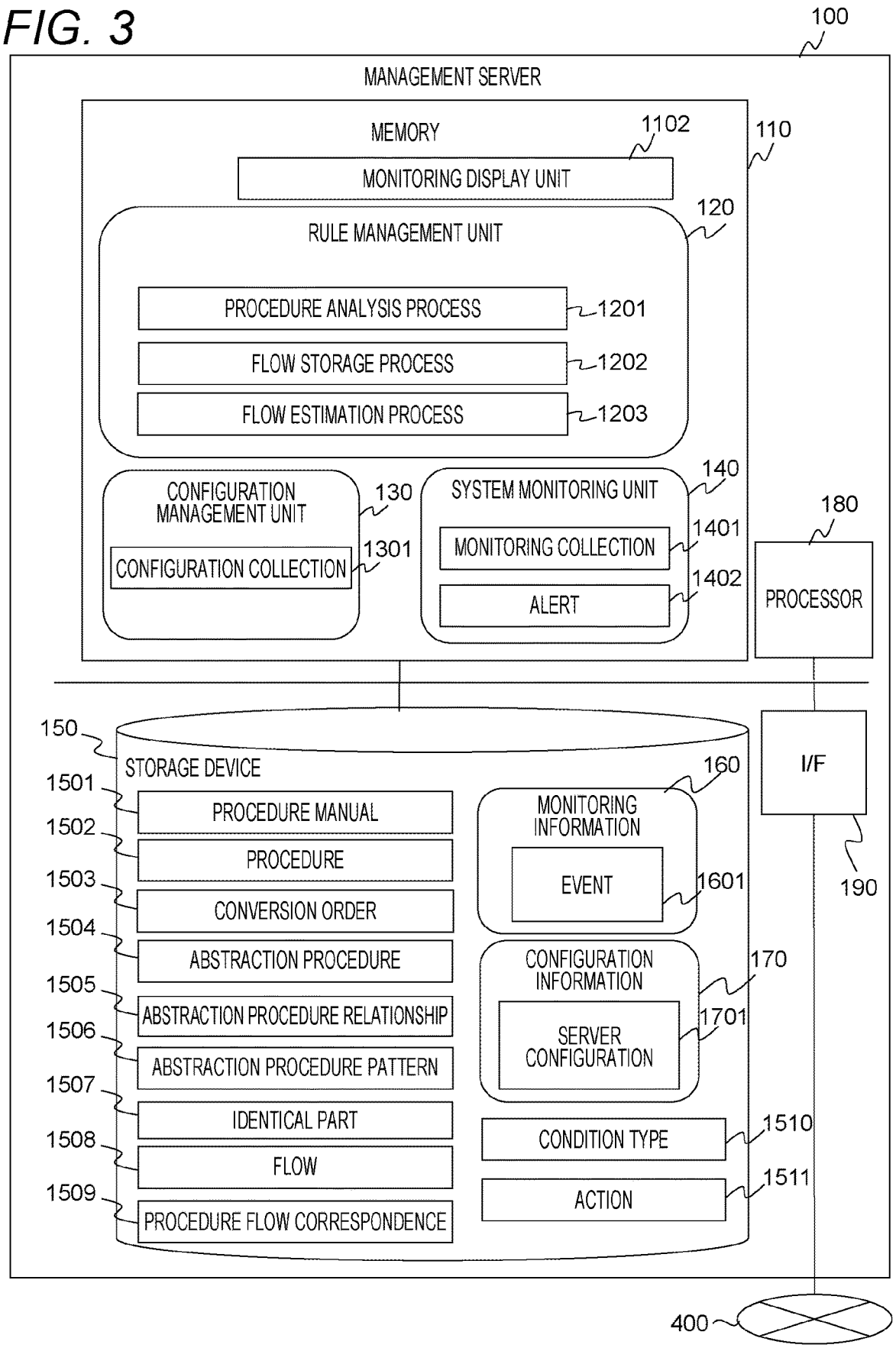
FIG. 3 illustrates a hardware configuration of a management server according to the embodiment.

FIG. 3 illustrates a hardware configuration of the management server 100.

The management server 100 includes a memory 110, a storage device 150, a processor 180, and an I/F (communication interface device) 190. The I/F 190 is connected to the network 400. The processor 180 is connected to the I/F 190, the memory 110, and the storage device 150. The I/F 190 is an example of the interface unit. At least the memory 110 between the memory 110 and the storage device 150 is an example of the storage unit. At least a part of information stored in the storage device 150 may be stored in an external storage device (not illustrated) connected to the management server 100 to be capable of communication, in place of or in addition to the storage device 150. The storage device 150 itself may be the external storage device. The processor 180 is an example of the processor unit.

In the memory 110, a program which is executed by the processor 180 to perform various processes is arranged. Specifically, for example, a monitoring display unit 1102, the rule management unit 120, the configuration management unit 130, and the system monitoring unit 140 are arranged in the memory 110. The rule management unit 120 executes the procedure analysis process 1201, a flow storage process 1202, and a flow estimation process 1203. The rule management unit 120 displays the flow editor screen 60 and displays a flowchart and edits a flowchart via the flow editor screen 60. The configuration management unit 130 executes a configuration collection process 1301. The system monitoring unit 140 executes a monitoring collection process 1401 and an alert process 1402.

The monitoring display unit 1102 displays various types of information collected by the system monitoring unit 140 on the management client 200.

The configuration collection process 1301 is a process of collecting configuration information of a system resource from each of the system resources constituting the target system 300.

The monitoring collection process 1401 is a process of collecting event information, various logs, and performance information from each of the system resources constituting the target system 300.

The alert process 1402 is a process of generating event information from various logs and performance information based on a threshold set in advance and abnormality log information (for example, information indicating a condition corresponding to an abnormality log). For example, the alert process 1402 includes a process of generating event information relating to a certain log if the certain log corresponds to the condition indicated by the abnormal log information. Further, the alert process 1402 includes a process of generating event information on a resource relating to performance value, for example, when a performance value (metric value) indicated by the performance information exceeds the threshold. In this manner, the event information may be generated in the system monitoring unit 140 or may be received from the target system 300.

The storage device 150 may be an auxiliary storage device such as a hard disk drive (HDD) or a solid state drive (SSD), or may be an external storage device such as a network attached storage (NAS). The storage device 150 stores various types of information. Specifically, for example, the storage device 150 stores the procedure manual 1501, a procedure table 1502, a conversion order table 1503, an abstraction procedure table 1504, an abstraction procedure relationship table 1505, an abstraction procedure pattern table 1506, an abstraction procedure identical part table 1507, a flow table 1508, a procedure flow correspondence table 1509, a condition type table 1510, an action table 1511, the monitoring information 160, and the configuration information 170. The monitoring information 160 includes, for example, an event table 1601 storing event information for each event. The configuration information 170 includes, for example, a server configuration table 1701 storing information indicating a physical server name, a correspondence relationship between a virtual machine and a physical server, and the like.

(1-3) Contents of Various Tables

FIG. 4 illustrates the procedure manual 1501.

The procedure manual 1501 is a document describing a plurality of procedures. The procedure manual 1501 is a table having an entry for each procedure (a data format of the procedure manual 1501 may be a data format other than the table). Each entry stores information such as a procedure 15011 and procedure ID 15010. Hereinafter, one procedure is taken as an example (referred to as a "target procedure" in the description of FIG. 4).

The procedure ID 15010 indicates an ID of the target procedure. The procedure 15011 is the target procedure itself, and is, for example, a natural sentence "escalation is not performed when an event with a message of xxx occurs between 12:00 and 12:30 occurs in host AAA". The procedure 15011 includes countermeasure contents and conditions. The countermeasure contents are, for example, "escalation is performed" and "escalation is not performed". The conditions are, for example, conditions such as a server name (for example, a physical server name), a time zone (for example, a start time and an end time), and a content of a message.

FIG. 5 illustrates the procedure table 1502.

The procedure table 1502 stores information on details of each procedure constituting the procedure manual 1501. Specifically, for example, the procedure table 1502 has an entry for each word in a procedure. Each entry stores information such as a procedure ID 15020, a procedure statement ID 15021, a word 15022, a condition type ID 15023, an action ID 15024, an abstraction procedure ID 15025, and an abstraction procedure statement ID 15026. Hereinafter, one word in a procedure will be taken as an example (referred to as a "target word" in the description of FIG. 5). Incidentally, the "word" in the procedure is a constituent element of the procedure, and is a character string (for example, a word, a phrase, a clause) that is a set of one or more characters.

The procedure ID 15020 indicates an ID of a procedure including the target word. The procedure statement ID 15021 indicates an ID of a procedure statement including the target word. The word 15022 indicates the target word. When the target word corresponds to a conditional clause, the condition type ID 15023 indicates an ID of a type of the condition. When the target word corresponds to a countermeasure content, the action ID 15024 indicates an ID of the countermeasure content (action). The abstraction procedure ID 15025 indicates an ID of an abstraction procedure obtained by abstracting a procedure including the target word. The abstraction procedure statement ID 15026 indicates an ID of an abstraction procedure statement obtained by abstracting the procedure statement including the target word.

When the target word corresponds to a condition, the rule management unit 120 stores a valid value as the condition type ID 15023 and stores an invalid value (for example, "–") as the action ID 15024. When the target word corresponds to a countermeasure content, the rule management unit 120 stores a valid value as the action ID 15110 and stores an invalid value as the condition type ID 15023. When the target word is neither the condition nor the countermeasure content, the rule management unit 120 stores invalid values as the condition type ID 15023 and the action ID 15024, respectively.

The rule management unit 120 extracts a common pattern of words (for example, character strings) in a plurality of procedures in the same cluster and stores an abstraction procedure including the extracted common pattern for each of the plurality of procedures. When the target word is included in the above described common pattern, the rule management unit 120 stores an ID of the abstraction procedure including the common pattern as the abstraction procedure ID 15025, and stores an ID of an abstraction procedure statement including the common pattern as the abstraction procedure statement ID 15026. When the target word is not included in the common pattern, the rule management unit 120 stores invalid values (for example, "–") as the abstraction procedure ID 15025 and the abstraction procedure statement ID 15026, respectively.

FIG. 6 illustrates the conversion order table 1503.

The conversion order table 1503 is a table that manages the order of procedures in the procedure list 221 of the flow editor screen 60, that is, an appropriate procedure conversion order to be presented to a user. The conversion order table 1503 is generated or corrected in, for example, the procedure analysis process 1201.

The conversion order table 1503 has an entry for each procedure. Each entry stores information such as a conversion order 15030 and a procedure ID 15031. Hereinafter, one procedure will be taken as an example (referred to as a "target procedure" in the description of FIG. 6).

The procedure ID 15031 indicates an ID of the target procedure. The conversion order 15030 indicates the order of converting the target procedure into a flowchart.

Incidentally, there may also be a case where the conversion orders 15030 of two or more procedures are the same. In the procedure list 221 of the flow editor screen 60, two or more rows corresponding to two or more procedures having the same conversion order 15030 may be arranged consecutively. Other formats may be adopted as a display format of the two or more procedures having the same conversion order 15030.

FIG. 7 illustrates the event table 1601.

The event table 1601 has, for example, an entry for each event. Each entry stores an event ID 16010 (an ID of an event) and event information. The event information may include the event ID 16010. The event information includes information such as a server name 16011 (a name of a server that has issued an event), a time 16012 (time when the event has occurred), an importance 16013 (for example, an event importance such as an "error" or "notification"), and a message 16014.

FIG. 8 illustrates the condition type table 1510.

The condition type table 1510 is a table holding information on a condition type. Specifically, for example, the condition type table 1510 has an entry for each condition type. Each entry stores information such as a condition type ID 15100, a condition type 15101, a condition value 15102, an acquisition source table 15103, acquisition source column 15104, an estimation flag 15105, and a flow ID 15106. Hereinafter, one condition type is taken as an example (referred to as a "target condition type" in the description of FIG. 8).

The condition type ID 15100 indicates an ID of the target condition type. The condition type 15101 indicates a fixed character string to identify the target condition type. The condition value 15102 indicates an expression example of a condition (for example, a conditional clause) corresponding to the target condition type. The acquisition source table 15103 indicates a name of a table in which a condition value expression corresponding to the target condition type is stored. The acquisition source column 15104 indicates a name of a column (or an information element) in which an expression as the condition value 15102 corresponding to the target condition type is stored. The estimation flag 15105 indicates whether the condition value 15102 corresponding to the target condition type is an estimate value. The estimation flag 15105 "Yes" means that the condition value 15102 is an estimated value. The flow ID 15106 is an ID of a flowchart including a logical expression corresponding to the expression as the condition value 15102 corresponding to the target condition type.

When valid values are stored as the acquisition source table 15103 and the acquisition source column 15104, the rule management unit 120 may store an invalid value (for example, "–") indicating that no value is stored as the condition value 15102.

Further, the rule management unit 120 may specify information having a similar expression as a condition value regarding the target condition type from the configuration information 170 and the monitoring information 160 and may use the specified condition value as an estimated value. In such a case, the rule management unit 120 sets the estimation flag 15105 corresponding to the target condition type to "Yes".

FIG. 9 illustrates the action table 1511.

The action table 1511 is a table managing an expression example of a concrete countermeasure content included in a procedure in association with an action type. Specifically, for example, the action table 1511 has an entry for each operation. Each entry holds information such as an action ID 15110, an action type 15111, an action expression 15112, and a flow ID 15113. Hereinafter, one action will be taken as an example (referred to as a "target action" in the description of FIG. 9).

The action ID 15110 indicates an ID of the target action (countermeasure content). The action type 15111 indicates a fixed character string to identify the target action (countermeasure content). The action expression 15112 indicates an expression example of the target action (countermeasure content). The flow ID 15113 indicates an ID of a flowchart including a logical expression corresponding to the action expression 15112 corresponding to the target action (countermeasure content).

FIG. 10 illustrates the abstraction procedure table 1504.

The abstraction procedure table 1504 is a table holding information on an abstraction procedure. Specifically, for example, the abstraction procedure table 1504 has an entry for each word in an abstraction procedure. Each entry stores information such as an abstraction procedure ID 15040, an abstraction procedure statement ID 15041, a word 15042, a condition type ID 15043, and an action ID 15044. Hereinafter, one word in an abstraction procedure will be taken as an example (referred to as a "target word" in the description of FIG. 10).

The abstraction procedure ID 15040 indicates an ID of an abstraction procedure including the target word. The abstraction procedure statement ID 15041 indicates an ID of an abstraction procedure statement including the target word. The word 15042 indicates the target word. When the target word corresponds to a conditional clause, the condition type ID 15043 indicates an ID of a type of the condition. When the target word corresponds to a countermeasure content, the action ID 15044 indicates an ID of the countermeasure content (action).

When the target word corresponds to a condition, the rule management unit 120 stores a valid value as the condition type ID 15043 and stores an invalid value (for example, "–") as the action ID 15044. When the target word corresponds to a countermeasure content, the rule management unit 120 stores a valid value as the action ID 15044 and stores an invalid value as the condition type ID 15043. When the target word is neither the condition nor the countermeasure content, the rule management unit 120 stores invalid values as the condition type ID 15043 and the action ID 15044, respectively.

FIG. 11 illustrates the abstraction procedure relationship table 1505.

The abstraction procedure relationship table 1505 is a table holding information indicating an inclusion relationship between abstraction procedures. Specifically, for example, the abstraction procedure relationship table 1505 has an entry for each abstraction procedure. Each entry stores information such as an abstraction procedure ID 15050, a child abstraction procedure ID 15051, and a parent abstraction procedure ID 15052. Hereinafter, one abstraction procedure will be taken as an example (referred to as a "target abstraction procedure" in the description of FIG. 11).

The abstraction procedure ID 15050 indicates an ID of the target abstraction procedure.

The child abstraction procedure ID 15051 is an ID of a child abstraction procedure of the target abstraction procedure, that is, an ID of a larger abstraction procedure including the target abstraction procedure (typically an abstraction procedure including all conditional clauses of the target abstraction procedure). Incidentally, there may also be a case where one or more additional child abstraction procedures including the child abstraction procedure of the target abstraction procedure. Hereinafter, each of all the abstraction procedures including the target abstraction procedure will be referred to as a "subordinate abstraction procedure", and a subordinate abstraction procedure directly relating to the target abstraction procedure will be particularly referred to as a "child abstraction procedure" in some cases.

The parent abstraction procedure ID 15052 is an ID of a parent abstraction procedure of the target abstraction procedure, that is, an ID of a smaller abstraction procedure included in the subject abstraction procedure (typically an abstraction procedure including some conditional clauses of all the conditional clauses of the target abstraction procedure as all conditional clauses). Incidentally, there may also be a case where one or more additional parent abstraction procedures included in the parent abstraction procedure of the target abstraction procedure. Hereinafter, each of all the abstraction procedures included in the target abstraction procedure will be referred to as a "superior abstraction procedure", and a superior abstraction procedure directly relating to the target abstraction procedure will be particularly referred to as a "parent abstraction procedure" in some cases.

FIG. 12 illustrates the abstraction procedure pattern table 1506.

The abstraction procedure pattern table 1506 is a table holding a phrase that is a part common between abstraction procedures in an inclusion relationship. Specifically, for example, the abstraction procedure pattern table 1506 has an entry for each phrase. Each entry stores information such as a phrase ID 15060 and a phrase 15061. Hereinafter, one phrase will be taken as an example (referred to as a "target phrase" in the description of FIG. 12).

The phrase ID 15060 indicates an ID of the target phrase. The phrase 15061 indicates the target phrase (character string pattern) itself.

FIG. 13 illustrates the abstraction procedure identical part table 1507.

The abstraction procedure identical part table 1507 is a table holding information indicating a place where a phrase appears. Specifically, for example, the abstraction procedure identical part table 1507 has an entry for each phrase. Each entry stores information such as an abstraction procedure ID 15070, an abstraction procedure statement ID 15071, a start position 15072, an end position 15073, and a phrase ID 15074. Hereinafter, one phrase will be taken as an example (referred to as a "target phrase" in the description of FIG. 13).

The abstraction procedure ID 15070 indicates an ID of an abstraction procedure including the target phrase. The abstraction procedure statement ID 15071 indicates an ID of an abstraction procedure statement including the target phrase. The start position 15072 indicates a start position of the target phrase (for example, the number of characters existing between the first character of the target phrase and the first character of the abstraction procedure including the target phrase). The end position 15073 indicates an end position of the target phrase (for example, the number of characters existing between the last character of the target phrase and the first character of the abstraction procedure including the target phrase). The phrase ID 15074 indicates an ID of the target phrase.

FIG. 14 illustrates the flow table 1508.

The flow table 1508 is a table holding a logical expression (a flowchart in the present embodiment) corresponding to a procedure. A part of the logical expression may be an estimated logical expression. Specifically, for example, the flow table 1508 has an entry for each flowchart. Each entry holds information such as a flow ID 15080 and a logical expression 15081. Hereinafter, one flowchart will be taken as an example (referred to as a "target flowchart" in the description of FIG. 14).

The flow ID 15080 indicates an ID of the target flowchart. The logical expression 15081 indicates a logical expression as the target flowchart.

For example, as illustrated in FIG. 14, the logical expression 15081 may be a program expression such as "SERVER_NAME_COND_1==AAA and [flow ID=2]" or may be in a flowchart format. In the above example, "SERVER_NAME_COND_1" is the condition type 15101, and "AAA" is the condition value 15102.

Further, "[flow ID=2]" means substitution with the logical expression having the flow ID 15080 "2". In this manner, the logical expression 15081 may be a nested structure. As a result, it is possible to manage a plurality of flowcharts as a single flowchart.

FIG. 15 illustrates the procedure flow correspondence table 1509.

The procedure flow correspondence table 1509 is a table that holds information indicating a correspondence relationship among a procedure, an abstraction procedure, a phrase, and a flowchart. Specifically, for example, the procedure flow correspondence table 1509 has an entry for each phrase. Each entry stores information such as a procedure ID 15090, a procedure statement ID 15091, an abstraction procedure ID 15092, an abstraction procedure statement ID 15093, a start position 15094, an end position 15095, a phrase ID 15096, a flow ID 15097, and a representative flag 15098. Hereinafter, one phrase will be taken as an example (referred to as a "target phrase" in the description of FIG. 15). Incidentally, the phrase may be the minimum unit, and the phrase may be one word in the present embodiment.

The procedure ID 15090 indicates an ID of a target procedure including the target phrase. The procedure statement ID 15091 indicates an ID of a procedure statement including the target phrase. The abstraction procedure ID 15092 indicates an ID of an abstraction procedure including the target phrase. The abstraction procedure statement ID 15093 indicates an ID of an abstraction procedure statement including the target phrase. The start position 15094 indicates a start position of the target phrase in the procedure. The end position 15095 indicates an end position of the target phrase in the procedure. The phrase ID 15096 is an ID of the target phrase. The flow ID 15097 is an ID of a flowchart including a flowchart portion corresponding to the target phrase. The representative flag 15098 indicates whether the flowchart is a representative flowchart.

The procedure flow correspondence table 1509 is updated at the following timing, for example, a timing when the operation manager has saved the flowchart through the flow editor 220 or a timing when the flowchart is estimated at least in one of the flow storage process 1202 and the flow estimation process 1203.

The representative flag 15098 is a flag configured to uniquely specify a flowchart corresponding to the abstraction procedure when there is a plurality of patterns of flowcharts corresponding to a certain abstraction procedure. This is because the abstraction procedure is extracted from a procedure set having similar sentences and there is a possibility that procedures of different intentions may be included in this procedure set. For example, procedures of "when XXX occurs in Server A and Server B" and "when XXX occurs in Server A or Server B" include "Server A" and "Server B" as conditional clauses, but logical structures of these procedures are entirely different as "and" and "or". However, there is a high possibility that similarities as natural languages are collected into the same procedure set. At this time, there is a possibility that variations may occur in flowcharts input to correspond to the respective procedures.

On the other hand, the present embodiment illustrates the example in which a flowchart, which is a logical structure included in a large number of flowcharts, is used as the representative flowchart among flowcharts corresponding to procedures in the procedure set (S8000 in a flow decomposition process). That is, when there is a plurality of candidates, the representative flowchart is displayed as an estimated flowchart.

Incidentally, the above method does not limit a method of obtaining the representative flowchart. Further, if there is a plurality of patterns of flowcharts corresponding to the abstraction procedure, the procedure set may be divided for each pattern of the flowchart with the detection as a trigger, and abstraction procedures and similarity relationships between abstraction procedures may be recalculated.

There is a plurality of update timings for the procedure flow correspondence table 1509. For example, values can be stored as the following (1) to (6). As will be described hereinafter, a "flowchart" exists for the whole procedure or abstraction procedure in some cases and exists for a part of the procedure or abstraction procedure (for example, a whole or part (for example, a phrase) of a procedure statement or an abstraction procedure statement) in the other cases in the present embodiment. In the following description, a constituent element of the flowchart will be referred to as a "node" in some cases. There may be a case where the node is the flowchart itself. That is, the node is a whole or part of the flowchart.

(1) The flow ID 15097 indicating a flowchart of the whole procedure corresponding to the designated procedure ID 15090 is stored.

(2) The flow ID 15097 indicating a flowchart of a procedure statement corresponding to the designated procedure ID 15090 and procedure statement ID 15091 is stored.

(3) The flow ID 15097 indicating a flowchart of a part of a procedure statement corresponding to the designated procedure ID 15090, procedure statement ID 15091, start position 15094, and end position is stored.

(4) The flow ID 15097 indicating a flowchart of a whole abstraction procedure corresponding to the designated abstraction procedure ID 15092 is stored.

(5) The flow ID 15097 indicating a flowchart of an abstraction procedure statement corresponding to the designated abstraction procedure ID 15092 and abstraction procedure statement ID 15093 is stored.

(6) The flow ID 15097 indicating a flowchart corresponding to a part (phrase) of an abstraction procedure statement corresponding to the designated abstraction procedure ID 15092, abstraction procedure statement ID 15093, start position 15094, end position 15095, and phrase ID 15096.

(1-4) Details of Processes Performed in Present Embodiment

Figure 17:
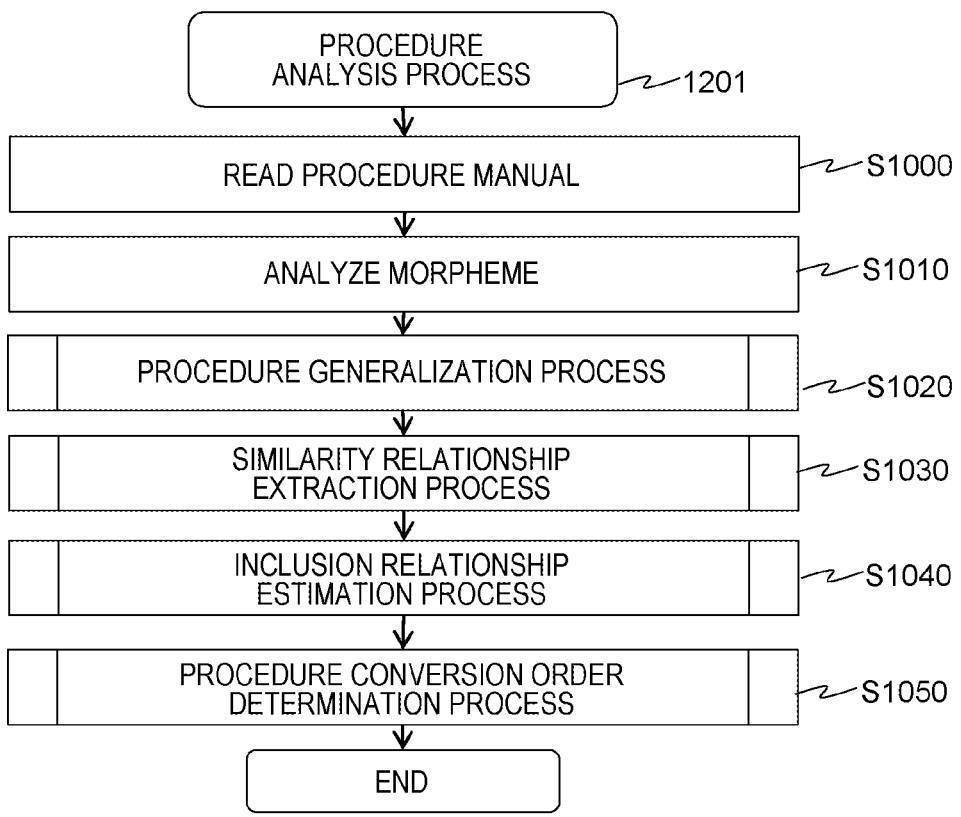
FIG. 17 illustrates a procedure analysis process according to the embodiment.

FIG. 17 illustrates the procedure analysis process 1201. The procedure analysis process 1201 is executed as preprocessing before converting each procedure into a flowchart. In the procedure analysis process, the rule management unit 120 specifies a relationship between procedures included in the procedure manual 1501.

First, the rule management unit 120 reads the procedure manual received as an input (for example, stores the procedure manual in the memory 110) (S1000).

Next, the rule management unit 120 extracts procedures included in the procedure manual and applies morphological analysis to each procedure (S1010). As a result, each procedure is decomposed into words. For example, the rule management unit 120 may extract only words corresponding to a specific part of speech (for example, nouns or verbs) from each procedure, or may collect a plurality of words into the meaningful unit to be regarded as one word for at least one of the one or more procedures. In S1020 and the subsequent steps, a word string (one or more words) obtained in S1010 is handled as a "procedure" for each procedure extracted in S1010.

Next, the rule management unit 120 executes the procedure generalization process (FIG. 18) in S1020 (S1020). In the procedure generalization process, the rule management unit 120 specifies a condition expression of a conditional clause included in the procedure and a word string indicating an action of a countermeasure content. In S1030 and the subsequent steps, a word obtained by replacing the word specified in S1020 with the corresponding condition type 15101 or action type 15111 is handled as a "procedure". Incidentally, the condition type 15101 and the action type 15111, and the word extracted in S1010 will be referred to as "words" without being distinguished from each other in the following description.

Next, the rule management unit 120 performs the similarity relationship extraction process (FIG. 19) (S1030). In the similarity relationship extraction process, the rule management unit 120 specifies a procedure set having a similarity and stores a word string pattern common in the procedure set as an abstraction procedure. Therefore, the abstraction procedure is common among one or more procedures belonging to the procedure set. Further, since the abstraction procedure is a word string pattern, the abstraction procedure statement is a part or whole of the word string pattern as the abstraction procedure.

Next, the rule management unit 120 performs the inclusion relationship estimation process (FIG. 20) (S1040). In the similarity relationship extraction process, the rule management unit 120 estimates an inclusion relationship between the abstraction procedures generated in S1030.

Finally, the rule management unit 120 performs the procedure conversion order determination process (FIG. 23) (S1050). In the procedure conversion order determination process, the rule management unit 120 orders the procedures based on the similarity relationship and the inclusion relationship between the procedures.

Figure 18:
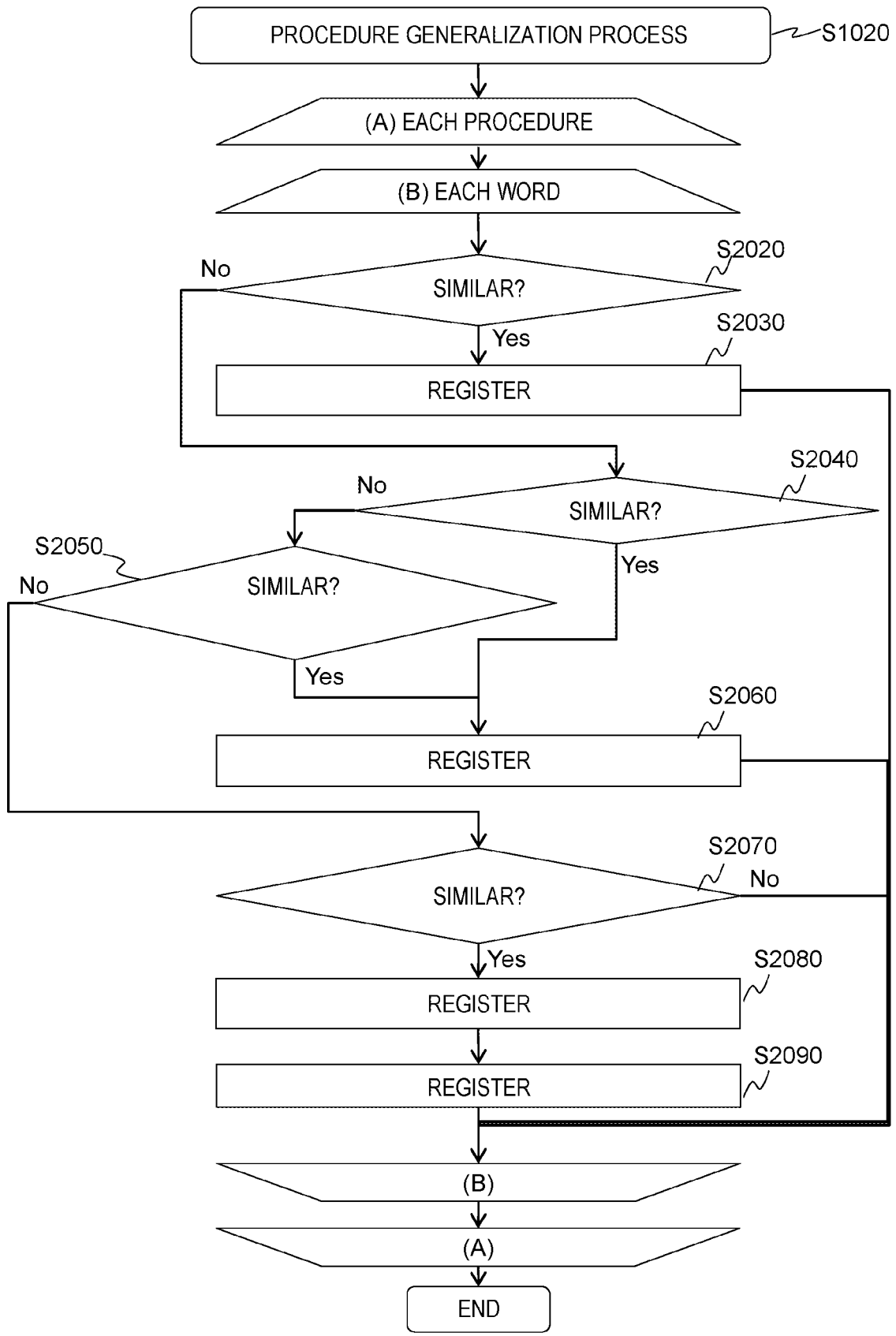
FIG. 18 illustrates a procedure generalization process according to the embodiment.

FIG. 18 illustrates the procedure generalization process (S1020).

The rule management unit 120 performs S2020 to S2090 for each word (for example, the word corresponding to the conditional clause and the word corresponding to the countermeasure content) in each procedure. Hereafter, one word in one procedure will be taken as an example (referred to as a "target phrase" and a "target work" in the description of S2020 to S2090). Incidentally, the "target word" may be a minimum word (a word as the minimum unit) or may be a combination of minimum words (a set of two or more minimum words). Specifically, for example, the "target word" may be N-Gram (N is an integer of one or more).

If the target word is the word corresponding to the countermeasure content, the rule management unit 120 determines whether there is the action expression 15112 similar to the target word (S2020). A similarity degree (similarity) of a character string such as the target word can be specified by, for example, a method such as calculation of a Levenshtein distance of the character string. If there is at least one action expression 15112 whose degree of similarity with the target word is equal to or greater than a certain value, a determination result in S2020 is true.

When the determination result of S2020 is true (S2020: Yes), the rule management unit 120 selects the similar action expression 15112 (for example, the action expression 15112 having a highest similarity degree) and registers the action ID 15110 corresponding to the selected action expression 15112, as the action ID 15024, in the corresponding entry (entry to which the word 15022 indicating the target word is registered) in the procedure table 1502 (S2030). In S2030, the procedure ID 15020 of the target procedure, the procedure statement ID 15021 of a procedure statement including the target word, and the word 15023 indicating the target word may also be registered in the corresponding entry.

When the determination result of S2020 is false (S2020: No), the rule management unit 120 determines whether there is the condition value 15102 similar to the target word if the target word is the word corresponding to the conditional clause (S2040).

When a determination result of S2040 is false (S2040: No), the rule management unit 120 determines whether there is a value (expression) similar to the target word from lattice pattern configuration information 170 or the monitoring information 160 (specifically, information indicated by the acquisition source table 15103 and the acquisition source column 15104) (S2050).

When the determination result of S2040 or S2050 is true (S2040: Yes or S2050: Yes), the rule management unit 120 registers a condition type ID of a condition type corresponding to a value (for example, the condition value 15102 or an expression) similar to the target word, as the condition type ID 15023, in the corresponding entry of the procedure table 1502 (S2060). In S2060, the procedure ID 15020 of the target procedure, the procedure statement ID 15021 of the procedure statement including the target word, and the word 15023 indicating the target word may also be registered in the corresponding entry.

When the determination result of S2050 is false (S2050: No), there is a possibility that the condition type of the conditional clause to which the target word corresponds is an unknown condition type (a condition type not included in the condition type table 1510). Therefore, the rule management unit 120 determines whether a value (expression) similar to the target word exists in the configuration information 170 or the monitoring information 160 (S2070).

When a determination result of S2070 is true (S2070: Yes), the rule management unit 120 generates a condition type corresponding to the similar value and a condition type ID of the condition type, and registers the condition type 15101 indicating the generated condition type, the condition type ID 15100 indicating the generated condition type ID, the condition value 15102 indicating the similar value, the acquisition source table 15103 and the acquisition source column 15104 that indicate an acquisition source of the value, and the estimation flag 15015 "Yes" in the condition type table 1510 (S2080). Further, the rule management unit 120 registers the registered condition type ID 15100, as the condition type ID 15023, in the corresponding entry of the procedure table 1502 (S2090). In S2090, the procedure ID 15020 of the target procedure, the procedure statement ID 15021 of the procedure statement including the target word, and the word 15023 indicating the target word may also be registered in the corresponding entry.

Figure 19:
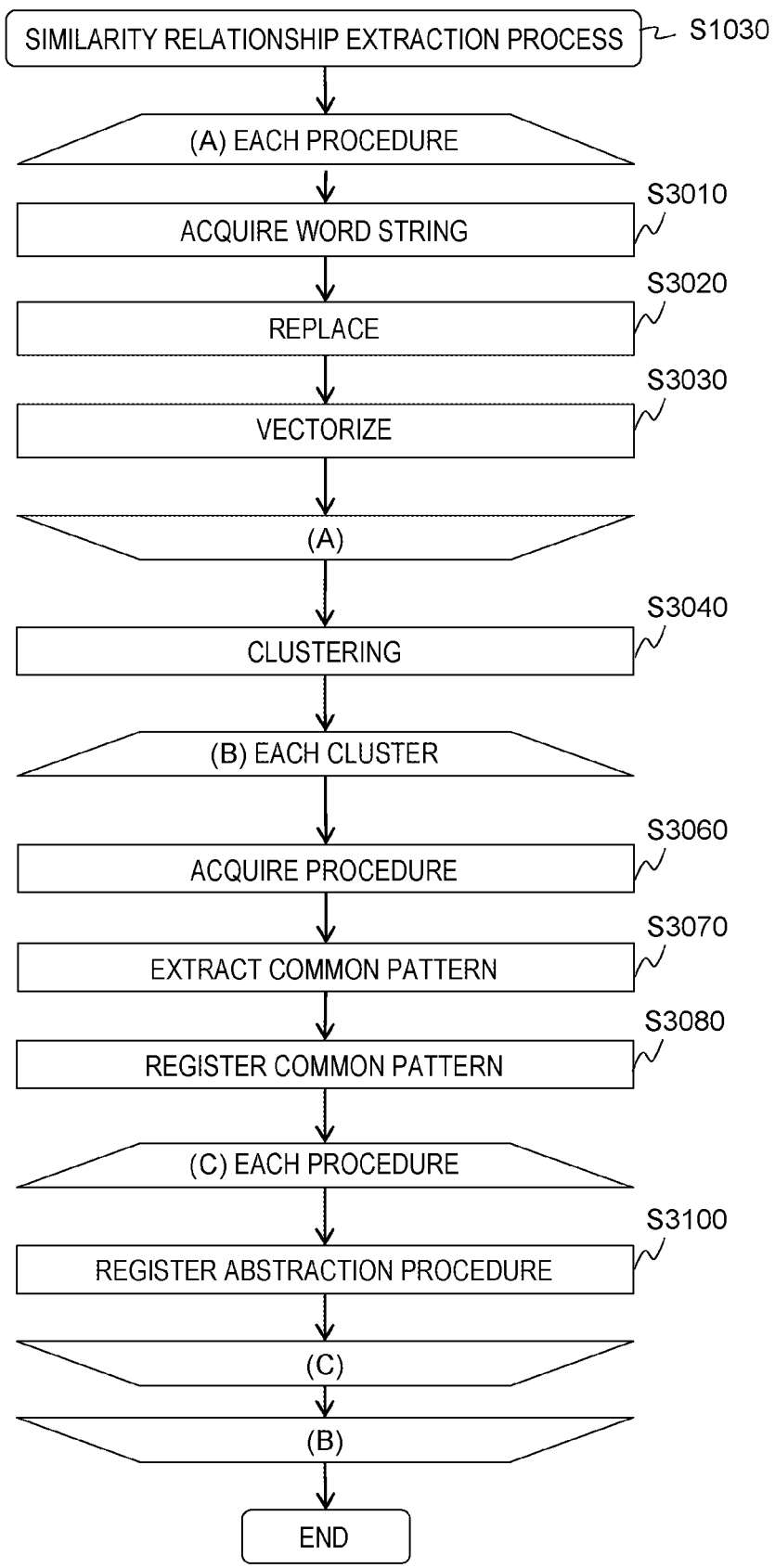
FIG. 19 illustrates a similarity relationship extraction process according to the embodiment.

FIG. 19 illustrates the similarity relationship extraction process (S1030). In the similarity relationship extraction process, the rule management unit 120 collects similar procedures by a method such as clustering, and extracts a common word string pattern, as an abstraction procedure, from a procedure set of one or more procedures in such a similarity relationship.

The rule management unit 120 performs S3010 to S3030 for each procedure. Hereinafter, one procedure is taken as an example (referred to as a "target procedure" in the description of S3010 to S3030).

The rule management unit 120 generates a word string constituted by one or more words indicated, respectively, by one or more words 15022 corresponding to the target procedure (S3010). At this time, for each of one or more words constituting the word string, when there is a valid value as the condition type ID 15023 or the action ID 15024 corresponding to the word, the rule management unit 120 substitutes the word with information (a word) indicated by the condition type 15101 or the action type 15111 corresponding to the ID (S3020). Then, the rule management unit 120 vectorizes the word string (S3030). As a method for the vectorization, for example, a known method such as TF-IDF can be used.

As above, procedures of which the condition values 15102 are different from each other can be handled as the same procedure by S3010 to S3030. Specifically, for example, when procedures have different configuration (for example, different server names or the like) although having the same content, the procedures are procedures having different expressions. However, such procedures having different configurations can be recognized as the same procedure according to S3010 to S3030.

Next, the rule management unit 120 clusters each procedure (word string). As a method of clustering, a known method (for example, a k-means method or agglomerative clustering) can be used.

Next, the rule management unit 120 performs S3060 to S3100 for each cluster. As a result, the abstraction procedure, which is the common pattern of the plurality of procedures, is obtained. Hereinafter, one cluster is taken as an example (referred to as a "target cluster" in the description of S3060 to S3100).

The rule management unit 120 acquires a procedure set including all procedures belonging to the target cluster (S3060).

The rule management unit 120 extracts a common word string pattern from the acquired procedure set (S3070). Specifically, for example, the rule management unit 120 generates one or more procedure pairs for the procedure set. Then, for each of the one or more procedure pairs, the rule management unit 120 obtains a Levenshtein distance in units of words, and extracts a word string pattern constituted by words whose Levenshtein distances are equal to or greater than an arbitrary threshold. Incidentally, the word string pattern may include words that are found at an arbitrary frequency or more for a whole procedure pair. Further, the word string pattern may be obtained by removing, for example, an arbitrary number of words more than or equal to zero from the procedure set. The word string pattern extracted in S3070 is an abstraction procedure.

The rule management unit 120 registers information on the abstraction procedure (word string pattern) extracted in S3070 in the abstraction procedure table 1504 (S3080). Specifically, for example, the rule management unit 120 generates the abstraction procedure ID 15040 and the abstraction procedure statement ID 15041 so as to have no duplication, and registers the abstraction procedure ID 15040 and the abstraction procedure statement ID 15041 in the abstraction procedure table 1504. Further, when a word included in the abstraction procedure includes any one of the condition types 15101, the rule management unit 120 registers the condition type ID 15100 corresponding to the condition type 15101 as the condition type ID 15043 in the abstraction procedure table 1504. Similarly, when the word included in the abstraction procedure includes any one of the action types 15111, the rule management unit 120 registers the action ID 15110 corresponding to the action type 15111 as the action ID 15044 in the abstraction procedure table 1504. In S3080, the word included in the abstraction procedure may be registered as the word 15042.

Thereafter, the rule management unit 120 performs S3100 for each of procedures constituting the procedure set acquired in S3060. Hereinafter, one procedure will be taken as an example (referred to as a "target procedure" in the description of S3100).

The rule management unit 120 registers information on an abstraction procedure corresponding to the target procedure in the procedure table 1502 (S3100). Specifically, for example, the rule management unit 120 specifies a word corresponding to a word in the abstraction procedure (word string pattern) extracted in S3070 from the target cluster. For this, for example, a method such as regular expression pattern matching can be used. Then, the rule management unit 120 registers the abstraction procedure ID 15025 indicating an ID of the abstraction procedure and the abstraction procedure statement 15026 indicating an ID of an abstraction procedure statement including a word corresponding to the specified word in a corresponding entry (an entry including the word 15022 indicating the specified word) in the procedure table 1502.

Figure 20:
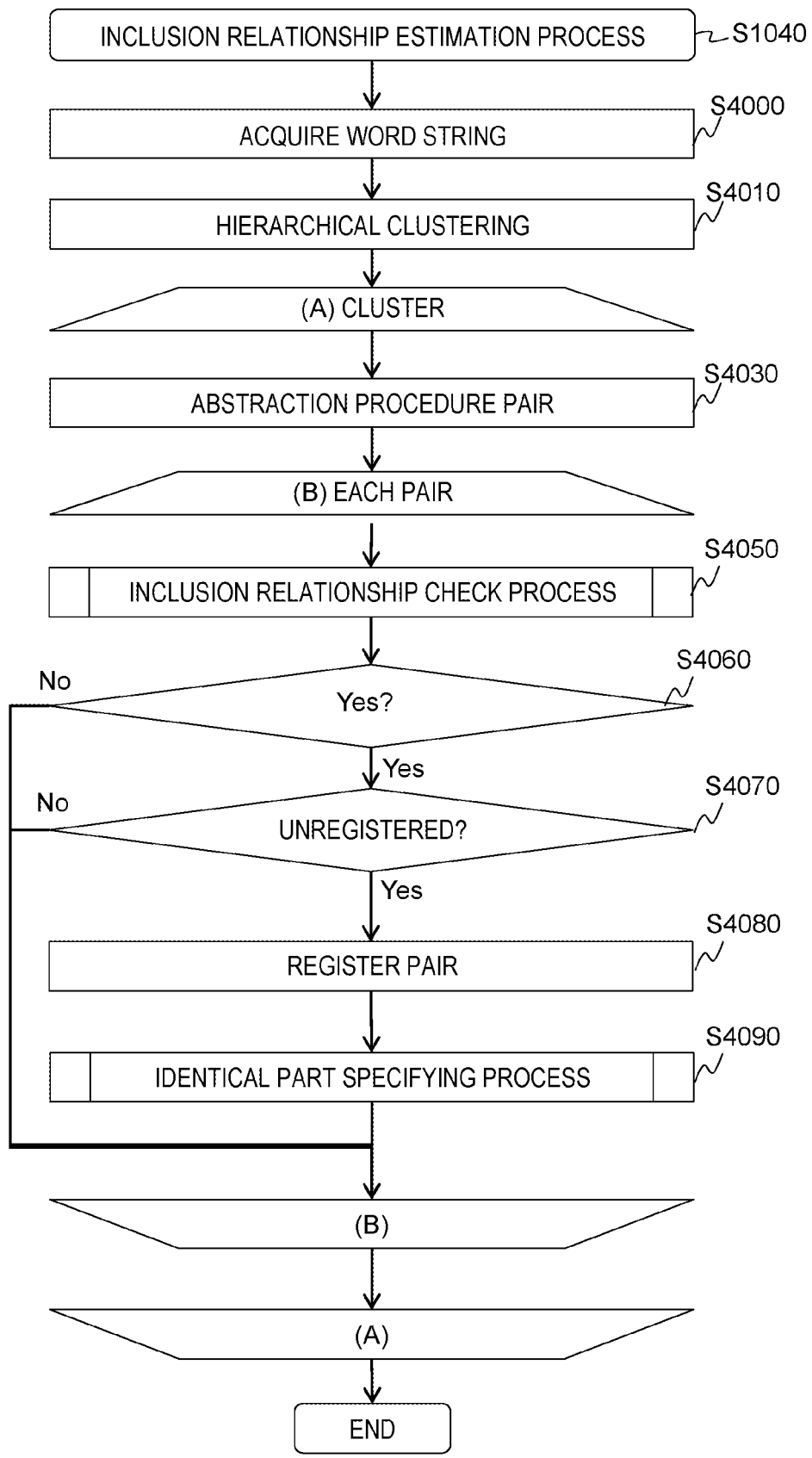
FIG. 20 illustrates an inclusion relationship estimation process according to the embodiment.

FIG. 20 illustrates the inclusion relationship estimation process (S1040).

The rule management unit 120 acquires all abstraction procedures (word string patterns) from the abstraction procedure table 1504 (S4000). At this time, for each of one or more words constituting the abstraction procedures, when there is a valid value as the condition type ID 15043 or the action ID 15044 corresponding to the word, the rule management unit 120 substitutes the word with information (a word) indicated by the condition type 15101 or the action type 15111 corresponding to the ID.

The rule management unit 120 converts the abstraction procedure (word string pattern) acquired in S4000 into a vector expression in the same manner as in S3030 and performs agglomerative clustering (S4010). When the agglomerative clustering is performed, the abstraction procedures are sequentially collected into clusters from abstraction procedures having a high similarity. As a result, eventually, the generated cluster can be expressed as a binary tree called a tree diagram.

Figure 16:
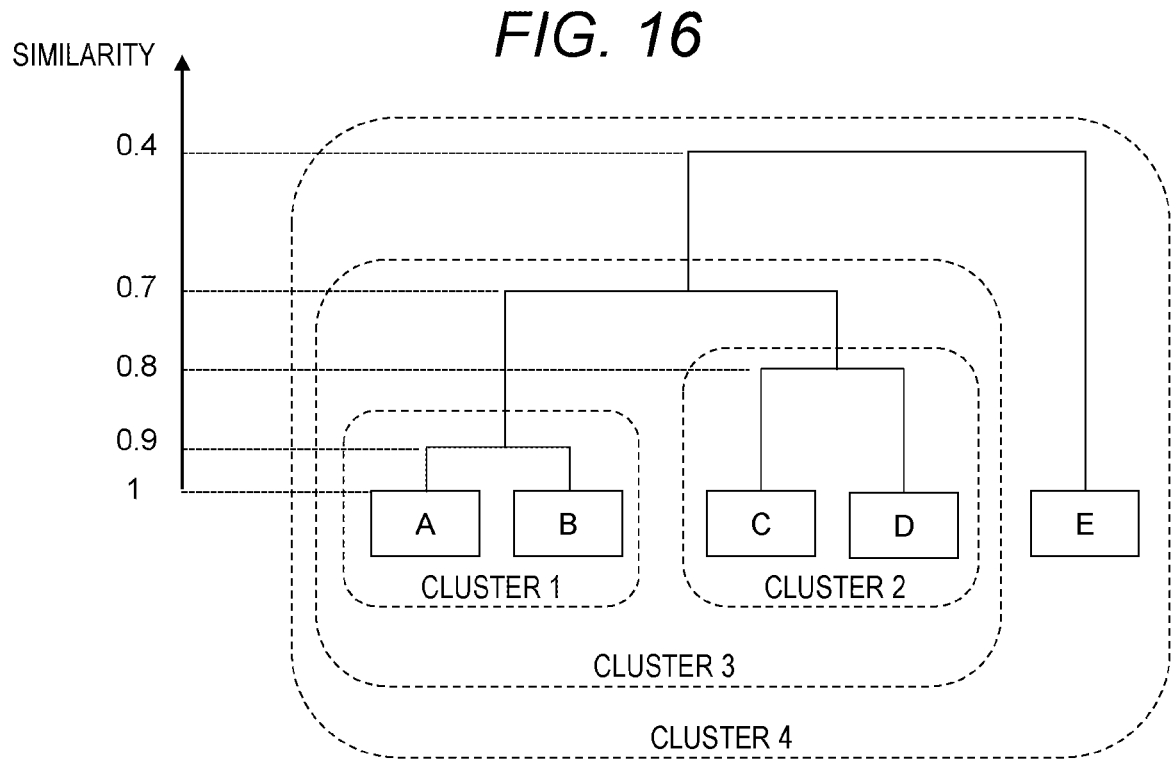
FIG. 16 illustrates an example of a tree diagram.

FIG. 16 illustrates an example of the tree diagram, specifically, an example in which Abstraction Procedures A to E are collected by the agglomerative clustering. Cluster 1 is a cluster obtained by collecting the Abstraction Procedures A and B. Cluster 2 is a cluster obtained by collecting abstraction target procedures C and D. Cluster 3 is a cluster obtained by collecting Cluster 2 and Cluster 1. Cluster 4 is a cluster obtained by collecting Cluster 3 and Abstraction Procedure E.

In the tree diagram, how much constituent elements of the cluster are similar to each other is called the "similarity degree". The similarity degree is between zero and one. The tree diagram is drawn with a leaf position as the similarity degree "1" and a root position as the similarity degree "0". Then, the tree diagram plots a joining point of nodes as a height corresponding to a similarity degree of constituent elements of a cluster. Hereinafter, left and right subtrees of a joining point will be referred to as left and right trees of a cluster in order to simplify the description. Further, the similarity degree between left and right nodes indicated by the height of the connection point will be referred to as the similarity degree of the cluster indicated by a subtree.

As illustrated in FIG. 16, a plurality of clusters is hierarchically configured in the agglomerative clustering, but there is a high possibility that abstraction procedures belonging to a smaller cluster have less excess or deficiency of word strings and are more similar.

Utilizing this feature, the rule management unit 120 selects clusters in descending order of the similarity degree regarding the clustering generated in S4010, and compares abstraction procedures included in the cluster with each other to sequentially estimate inclusion relationships. The rule management unit 120 performs S4030 to S4090 for each cluster. Hereinafter, one cluster is taken as an example (referred to as a "target cluster" in the description of S4030 to S4090).

The rule management unit 120 selects one abstraction procedure from each of left and right trees in the target cluster, and generates an abstraction procedure pair which is a pair of the selected abstraction procedures (S4030). Regarding the target cluster, S4050 to S4090 are performed for each abstraction procedure pair. Hereinafter, one abstraction procedure pair will be taken as an example (referred to as a "target abstraction procedure pair" in the description of S4050 to S4090). Incidentally, when a similarity degree of a cluster is equal to or less than an arbitrary threshold, there is a high possibility that the abstraction procedures included in the left and right trees in the cluster are not similar, and thus, processing such as termination of a loop may be adopted.

The rule management unit 120 performs the inclusion relationship check process for the target abstraction procedure pair (S4050). In the inclusion relationship check process, whether the target abstraction procedure pair is in an inclusion relationship is checked (estimated).

If a check result is false (S4060: No), the rule management unit 120 selects the next abstraction procedure pair without performing the processing of S4070 and the subsequent steps.

On the other hand, if the check result is true (S4060: Yes), the rule management unit 120 performs S4070 to S4090 for the target abstraction procedure pair.

That is, the rule management unit 120 determines whether information on the target abstraction procedure pair is unregistered in the abstraction procedure relationship table 1505 (S4070).

When the determination result in S4070 is true (S4070: Yes), the rule management unit 120 registers the information on the target abstraction procedure pair in the abstraction procedure relationship table 1505 (S4080).

Specifically, the rule management unit 120 specifies a parent-child relationship of the target abstraction procedure pair based on the result of the inclusion relationship check process. For a parent abstraction procedure in the target procedure pair, if there is an entry including an ID of the parent abstraction procedure as the abstraction procedure ID 15050, the rule management unit 120 registers an ID of a child abstraction procedure in the target abstraction procedure pair, as the child abstraction procedure ID 15051, in the entry. Further, for a child abstraction procedure in the target abstraction procedure pair, if there is an entry including an ID of the child abstraction procedure as the abstraction procedure ID 15050, the rule management unit 120 registers an ID of a parent abstraction procedure in the target abstraction procedure pair, as the parent abstraction procedure ID 15052, in the entry. Incidentally, if there is no corresponding entry, the rule management unit 120 newly creates an entry in the abstraction procedure relationship table 1505. Incidentally, if the ID of the child abstraction procedure in the target abstraction procedure pair has been registered as the child abstraction procedure ID 15051 of a child abstraction procedure including any existing abstraction procedure, the rule management unit 120 does not necessarily register the ID of the child abstraction procedure in the target abstraction procedure pair as the child abstraction procedure ID 15051 in S4080. Similarly, if the ID of the parent abstraction procedure in the target abstraction procedure pair has been registered as the parent abstraction procedure ID 15052 of a parent abstraction procedure included in any existing abstraction procedure, the rule management unit 120 does not necessarily register the ID of the parent abstraction procedure in the target abstraction procedure pair as the parent abstraction procedure ID 15052.

The rule management unit 120 performs the identical part specifying process for the target abstraction procedure pair (S4090).

Figure 21:
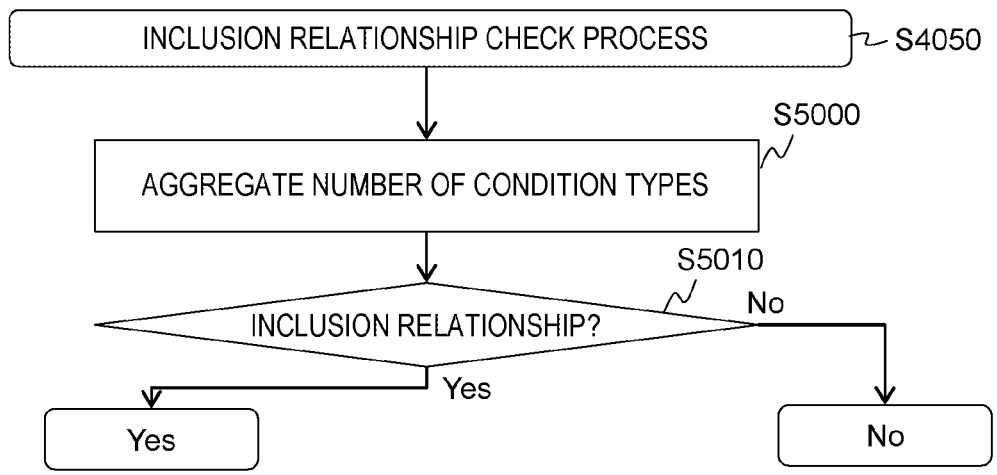
FIG. 21 illustrates an inclusion relationship check process according to the embodiment.

FIG. 21 illustrates the inclusion relationship check process (S4050). The inclusion relationship check process is a process of determining whether two abstraction procedures constituting a target abstraction procedure pair as an input are in an inclusion relationship.

For each of the abstraction procedures constituting the target abstraction procedure pair, the rule management unit 120 totals the number of condition types included in the abstraction procedure (S5000). If a relationship between the abstraction procedures constituting the target abstraction procedure pair is in the inclusion relationship, it is considered that a similarity degree between these target procedures is high, and the included condition types and the number of condition types are in the inclusion relationship. Therefore, the rule management unit 120 determines whether the target abstraction procedure pair has the inclusion relationship (whether the two abstraction procedures constituting the target abstraction procedure pair are in the inclusion relationship) based on the condition types and the number of the condition types totaled for each abstraction procedure in S5000 (S5010). For example, if a first abstraction procedure includes all condition types included in a second abstraction procedure, the target abstraction procedure pair has the inclusion relationship. On the other hand, if the first abstraction procedure does not include at least one condition type included in the second abstraction procedure, the target abstraction procedure pair has no inclusion relationship. The rule management unit 120 sets a determination result (true (Yes) or false (No)) in S5010 as a check result and returns the check result as a return value.

Figure 22:
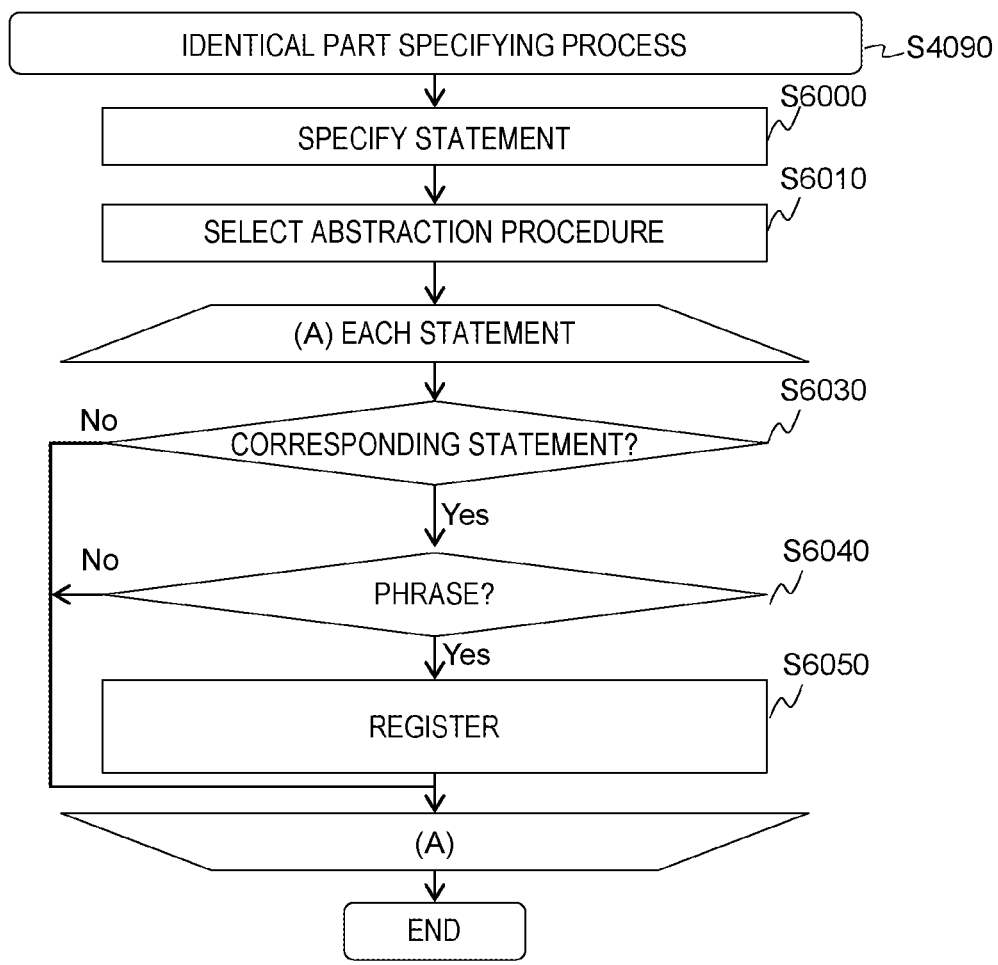
FIG. 22 illustrates an identical part specifying process according to the embodiment.

FIG. 22 illustrates the identical part specifying process (S4090). The identical part specifying process is a process of specifying a common word string pattern from the target abstraction procedure pair that has been estimated to be in the inclusion relationship.

The rule management unit 120 specifies a correspondence relationship of abstraction procedure statements regarding the target abstraction procedure pair (S6000). Specifically, for example, the rule management unit 120 may substitute the abstraction procedure statements with vector expressions using the method such as the Levenshtein distance or the TF-IDF to obtain an abstraction procedure statement pair having a distance between vectors equal to or less than a certain threshold or may add a restriction such that appearance orders of the abstraction procedure statements coincide.

After that, the rule management unit 120 selects an abstraction procedure having a smaller number of abstraction procedure statements (S6010). Then, the rule management unit 120 performs S6030 to S6050 for each abstraction procedure statement within the selected abstraction procedure. Hereinafter, one abstraction procedure statement will be taken as an example (referred to as a "target abstraction procedure statement" in the description of S6030 to S6050).

The rule management unit 120 determines whether an abstraction procedure statement corresponding to the target abstraction procedure statement has been specified in S6000 (S6030).

If a determination result in S6030 is true (S6030: No), the rule management unit 120 compares the target abstraction procedure statement with the abstraction procedure statement corresponding to the target abstraction procedure statement to determine whether there is a common part (phrase) between these abstraction procedure statements (S6040). Here, for example, the rule management unit 120 may extract a word string with N-Gram for word strings included in one abstraction procedure statement and determine whether the extracted word string is included in the other abstraction procedure statement. Further, for example, the phrase may be a simple coincident portion or a portion as a regular expression that may be included in both the abstraction procedures.

If the determination result in S6040 is true (S6040: Yes), the rule management unit 120 updates the abstraction procedure pattern table 1506 and the abstraction procedure identical part table 1507 (S6050). Specifically, for example, the rule management unit 120 generates the phrase ID 15060 so as to have no duplication, and registers the phrase ID 15060 and the phrase 15061 in the abstraction procedure pattern table 1506. Further, for the target abstraction procedure statement, the rule management unit 120 registers positions (the start position 15072 and the end position 15073) where the phrase extracted in S6040 appears, and the phrase ID 15074 (the same ID as the generated phrase ID 15060) of the phrase in the abstraction procedure identical part table 1507.

Figure 23:
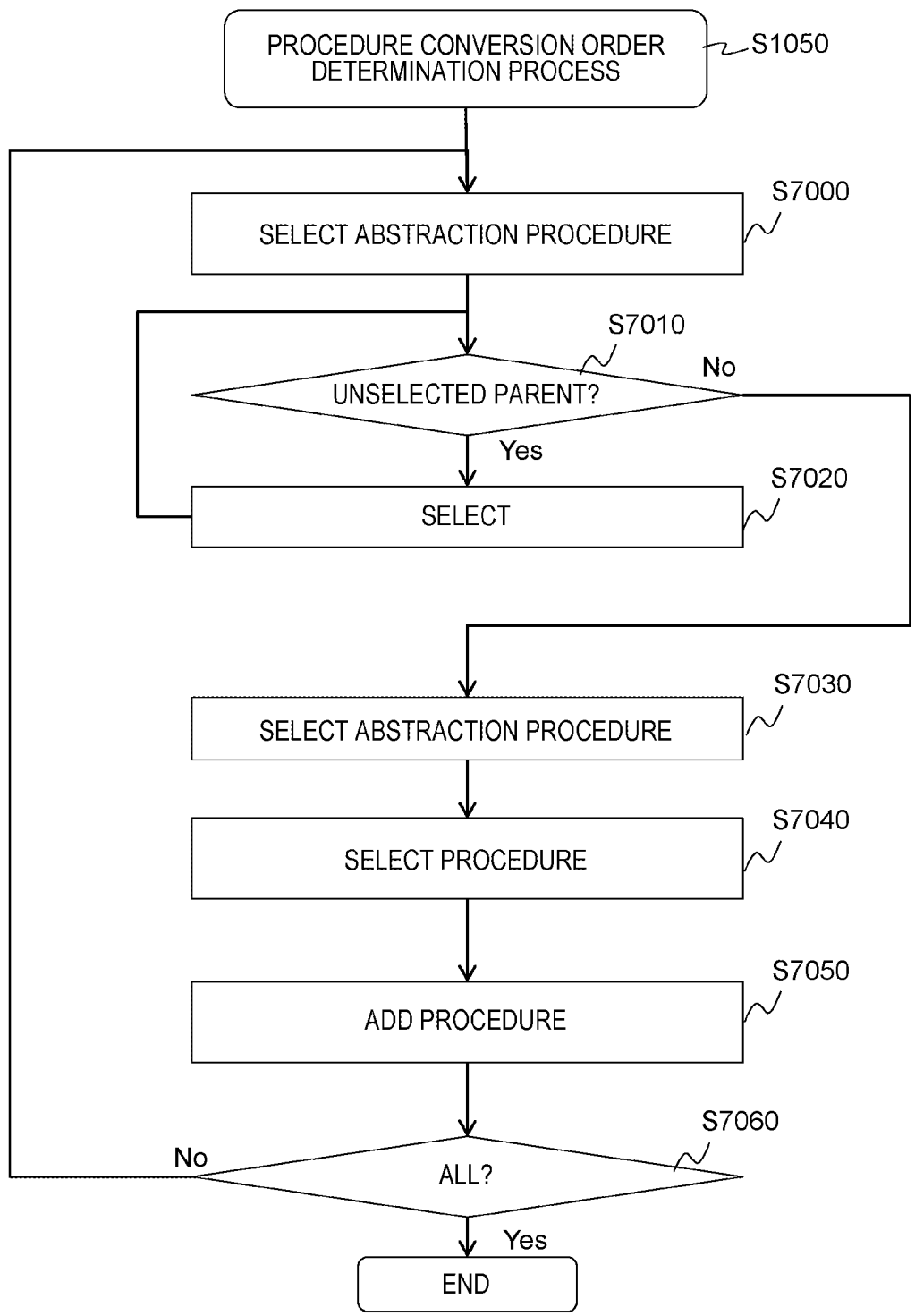
FIG. 23 illustrates a procedure conversion order determination process according to the embodiment.

FIG. 23 illustrates the procedure conversion order determination process (S1050). The procedure conversion order determination process is a process of determining a recommended order of converting procedures into flowcharts based on a relationship between the procedures extracted by the similarity relationship extraction process and the inclusion relationship estimation process.

The rule management unit 120 refers to the abstraction procedure relationship table 1505 to select an abstraction procedure which is the most ancestor (for example, an abstraction procedure with fewest words (conditional clauses)) among unselected abstraction procedures having the inclusion relationship (S7000).

The rule management unit 120 determines whether there is an unselected superior abstraction procedure among the upper abstraction procedures of the abstraction procedure selected in S7000 (S7010). If the determination result in S7010 is true (S7010: Yes), the rule management unit 120 selects one superior abstraction procedure out of the unselected superior abstraction procedures (S7020) and makes a determination of S7010.

If the determination result in S7010 is false (S7010: No), the rule management unit 120 selects the abstraction procedure (the abstraction procedure selected in S7000) (S7030).

Next, the rule management unit 120 selects all procedures corresponding to the abstraction procedure ID 15025 of the abstraction procedure selected in S7030 from the procedure table 1502 (S7040).

Thereafter, the rule management unit 120 generates the conversion orders 15030 such that the conversion orders 15030 of the respective procedures corresponding to the abstraction procedure selected in S7030 becomes a serial number (the next order) of the conversion order of each procedure corresponding to a parent abstraction procedure of the abstraction procedure selected in S7030, and registers the conversion order 15030 and the procedure ID 15031 of the procedure selected in S7040 in the procedure conversion order table 1503 (S7050).

Thus, S7000 to S7050 are repeated for all the abstraction procedures (S7060). As a result, for each abstraction procedure belonging to the same inclusion relationship, the conversion order of each procedure corresponding to the abstraction procedure is set as the next order of a conversion order of each procedure corresponding to a parent abstraction procedure of the abstraction procedure. Specifically, for example, when a first abstraction procedure is a parent abstraction procedure of a second abstraction procedure, and a conversion order of each procedure corresponding to the first abstraction procedure is X (X is a natural number), a conversion order of each procedure corresponding to the second abstraction procedure is X+1.

Figure 24:
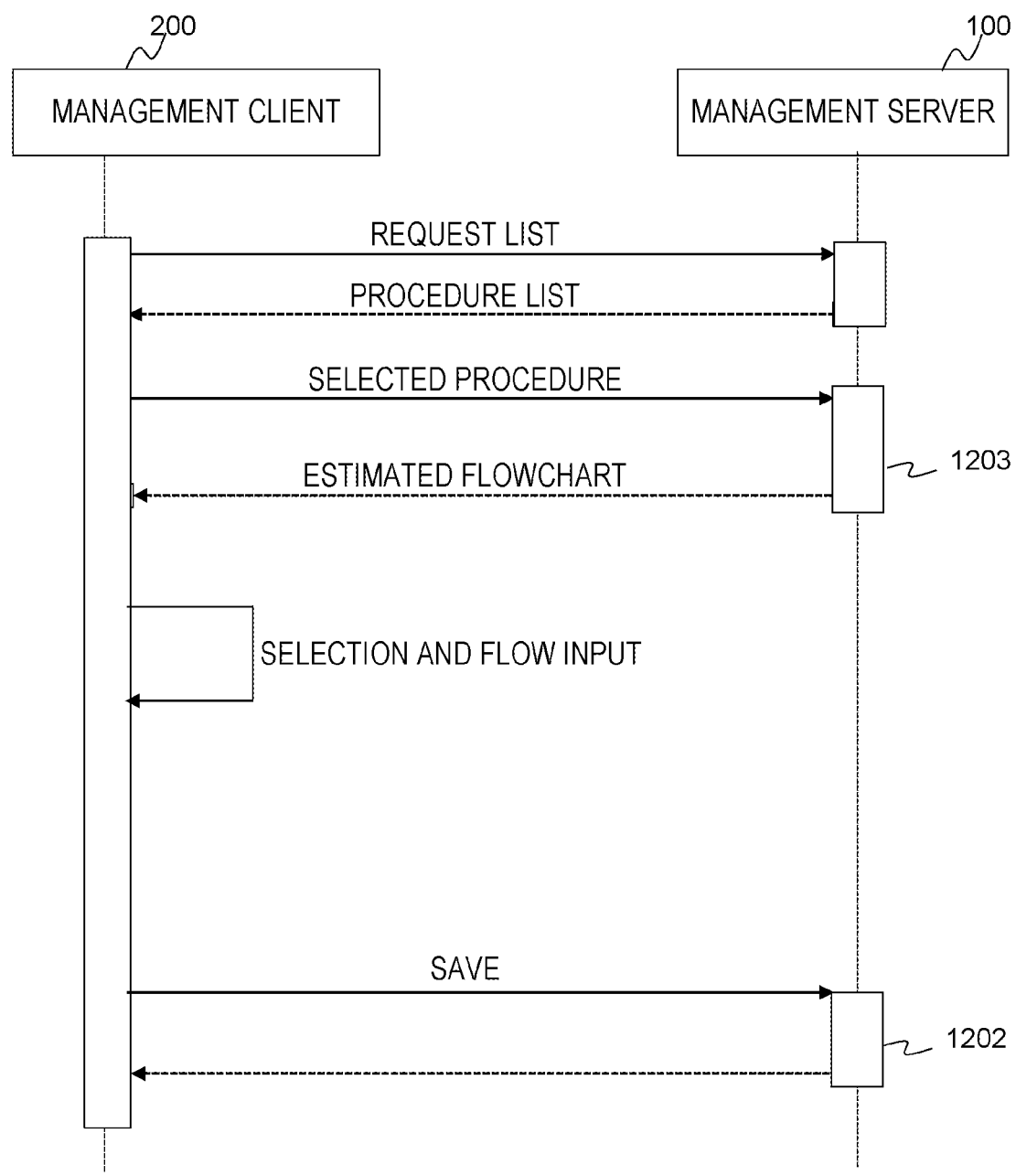
FIG. 24 illustrates an overall sequence of procedure flowchart conversion according to the embodiment.

FIG. 24 illustrates an overall sequence of procedure flowchart conversion.

The flow editor 220 of the management client 200 receives a procedure flowchart conversion operation from the operation manager and transmits a procedure list request according to the operation to the management server 100. The rule management unit 120 of the management server 100 receives the procedure list request. In response to the request, the rule management unit 120 transmits a list of combinations of the conversion orders 15030 and the procedures 15011 (which may further include the procedures ID 15010) to the management client 200. The flow editor 220 of the management client 200 displays a list of procedures aligned in accordance with the conversion order 15030 in the procedure list 221 of the flow editor screen 60.

The flow editor 220 receives selection of a procedure through the procedure list 221 from the operation manager and transmits a procedure ID of the selected procedure (in place of or in addition to a procedure ID) to the management server 100. The rule management unit 120 of the management server 100 performs the flow estimation process 1203 including reception of the procedure ID of the selected procedure, and transmits at least one of an estimated flowchart of a whole or part of the selected procedure and an estimated portion (procedure statement or phrase) out of the selected procedure to the management client 200. The flow editor 220 of the management client 200 displays the procedure and the estimated flowchart on the procedure display 222 and the flow input 223 based on the received information. Incidentally, when a procedure portion such as a procedure statement, a phrase, and a word is designated by an input device such as a mouse, the flow editor 220 can also specify and highlight an estimated flowchart portion (for example, a whole node or a corresponding portion in a character string in the node) corresponding to the designated procedure portion by inquiring the rule management unit 120 (or referring to the procedure flow correspondence table 1509).

The flow editor 220 receives selection of a whole procedure, a procedure statement, or a phrase and an input of a flowchart corresponding to the selected portion, from the operation manager, in the procedure display 222. At this time, the flow editor 220 may highlight an estimation flow portion corresponding to the selected portion and then receive correction of the flowchart. The flow editor 220 holds the input flowchart and a procedure correspondence relationship (a relationship between at least two among the whole procedure, the procedure statement, and the phrase). When receiving an instruction to save the flowchart from the operation manager, the flow editor 220 transmits the input flowchart and the held procedure correspondence relationship to the management server 100. The rule management unit 120 of the management server 100 performs the flow storage process 1202 to save the flowchart and the correspondence relationship and notifies the flow editor 220 of a completion notice.

Incidentally, those other than the procedure may be displayed in the procedure list 221. For example, an estimation flow may be displayed, or a ratio (coverage) of an estimated portion in the procedure may be displayed. Further, the operation manager does not necessarily make the save instruction explicitly. For example, the flow storage process 1202 may be performed simultaneously with the input of the flowchart without an explicit save instruction. At this time, the display of the procedure list 221 may be updated as described above.

Figure 25:
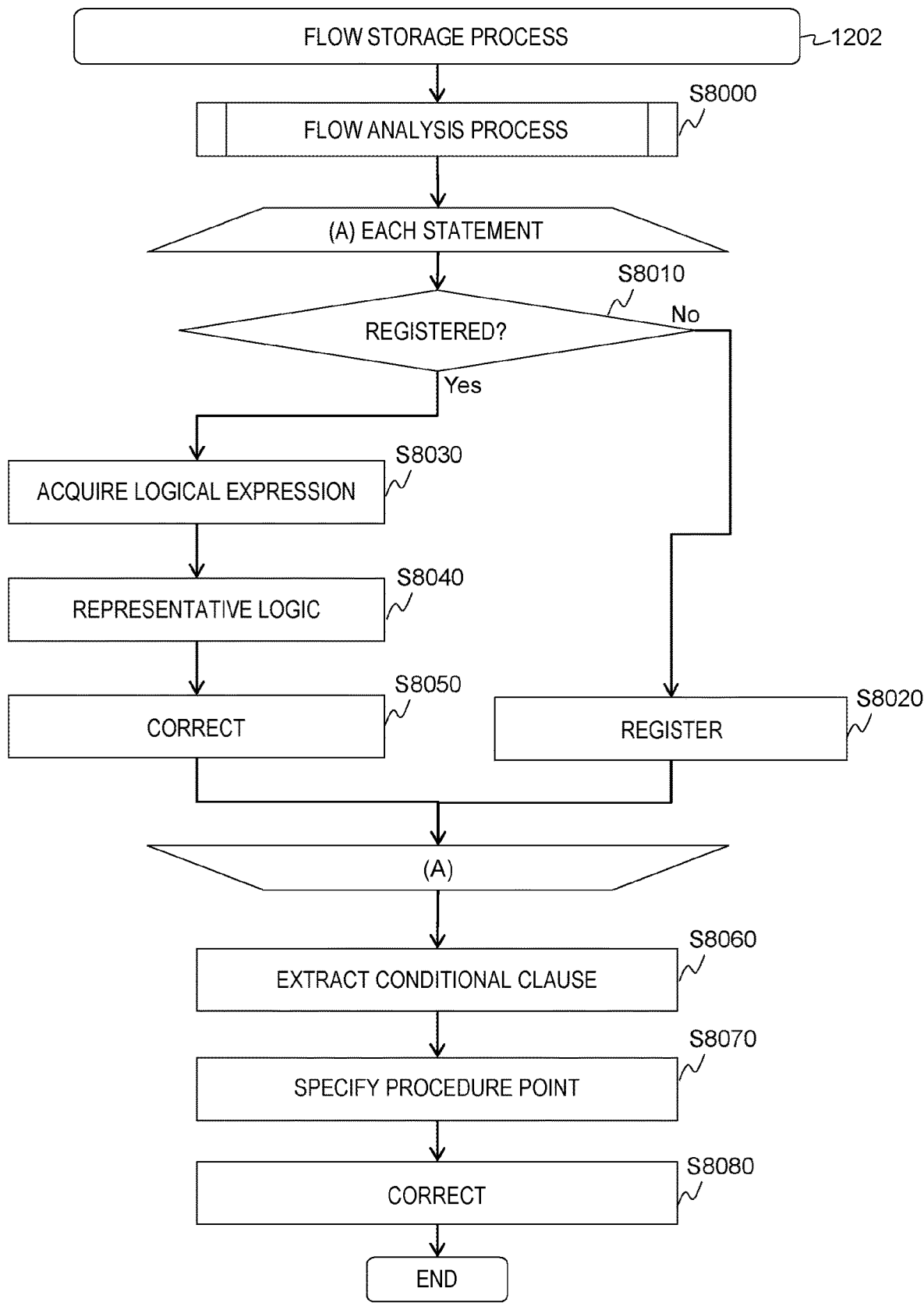
FIG. 25 illustrates a flow storage process according to the embodiment.

FIG. 25 illustrates the flow storage process 1202. The flow storage process 1202 is a process of storing the received flowchart.

In the flow table 1508, it is possible to refer to the other flow ID 15080 from the logical expression 15081 as illustrated in FIG. 14. For example, a flowchart corresponding to a phrase can be referenced from a flowchart corresponding to a procedure statement. Thus, the rule management unit 120 first performs the flow decomposition process (S8000). As a result, it is possible to decompose the received procedural portion into an abstraction procedure, a phrase, and the like, which are finer units, and obtain flowcharts corresponding to those units. S8010 to S8050 are performed for each flowchart. Hereinafter, one flowchart will be taken as an example (referred to as a "target flowchart" in the description of S8010 to S8050).

The rule management unit 120 determines whether the information on the target flowchart has been registered in the procedure flow correspondence table 1509 (S8010). Specifically, for example, the rule management unit 120 determines whether an ID corresponding to the target flowchart (for example, a subset of the procedure ID, a procedure statement, an abstraction procedure ID, an abstraction procedure statement ID, a start position, and an end position) has been registered in the procedure flow correspondence table 1509.

If a determination result in S8010 is false (S8010: No), the rule management unit 120 registers the ID corresponding to the target flowchart in the procedure flow correspondence table 1509 (S8020). At this time, the representative flag 15098 associated with the ID is "Yes".

On the other hand, if the determination result in S8010 is true (S8010: Yes), the rule management unit 120 generates a flowchart obtained by eliminating a difference between the target flowchart and a flowchart corresponding to the existing ID as a representative flowchart. Specifically, the rule management unit 120 performs S8030 to S8050.

That is, the rule management unit 120 acquires a flowchart group (one or more flowcharts) matching with the ID corresponding to the target flowchart and having the representative flag 15098 "No" from the procedure flow correspondence table 1509 (S8030).

Then, the rule management unit 120 compares the flowchart group acquired in S8030 with the target flowchart to generate the representative flowchart (S8040). Specifically, for example, the rule management unit 120 selects a condition type or an action type that exists in a majority number (one example of a predetermined ratio) of flowcharts in the flowchart group. Then, when a logical connection relationship between nodes indicating the selected condition type or action type exists in the above-described majority number of flowcharts, the rule management unit 120 connects the nodes indicating the condition type or the action type in the target flowchart based on the logical connection relationship. As a result, the representative flowchart is generated as a form of a plurality of graphs.

Thereafter, the rule management unit 120 registers information on the representative flowchart generated in S8040 in the procedure flow correspondence table 1509 (S8050). At this time, the representative flag 15098 is "Yes" for the flowchart.

After S8000 to S8050 (after registering the received flowchart), the rule management unit 120 confirms the conditional clause estimated in the procedure generalization process (S1020) based on the received flowchart.

Specifically, first, the rule management unit 120 extracts a node of a conditional clause describing a condition expression from the received flowchart (S8060).

Then, the rule management unit 120 specifies a procedure portion corresponding to the conditional clause corresponding to the node extracted in S8060 based on an entry corresponding to a condition type included in the extracted node (an entry of the condition type table 1510, for example, the condition value 15102 and information on a condition value expression included in a table part indicated by the acquisition source table 15103 and the acquisition source column 15104) (S8070). For example, the rule management unit 120 may search a word similar to the above condition expression from the procedure. Incidentally, if there is no entry including the information on the conditional clause corresponding to the node extracted in S8060 in the condition type table 1510, the rule management unit 120 adds such an entry to the condition type table 1510.

If the estimation flag 15105 in the entry (entry of the condition type table 1510) specified in S8070 is "Yes", the rule management unit 120 changes the estimation flag 15105 to "No" and registers an expression of the procedure portion specified in S8070 as the condition value 15102 (S8080).

Figure 26:
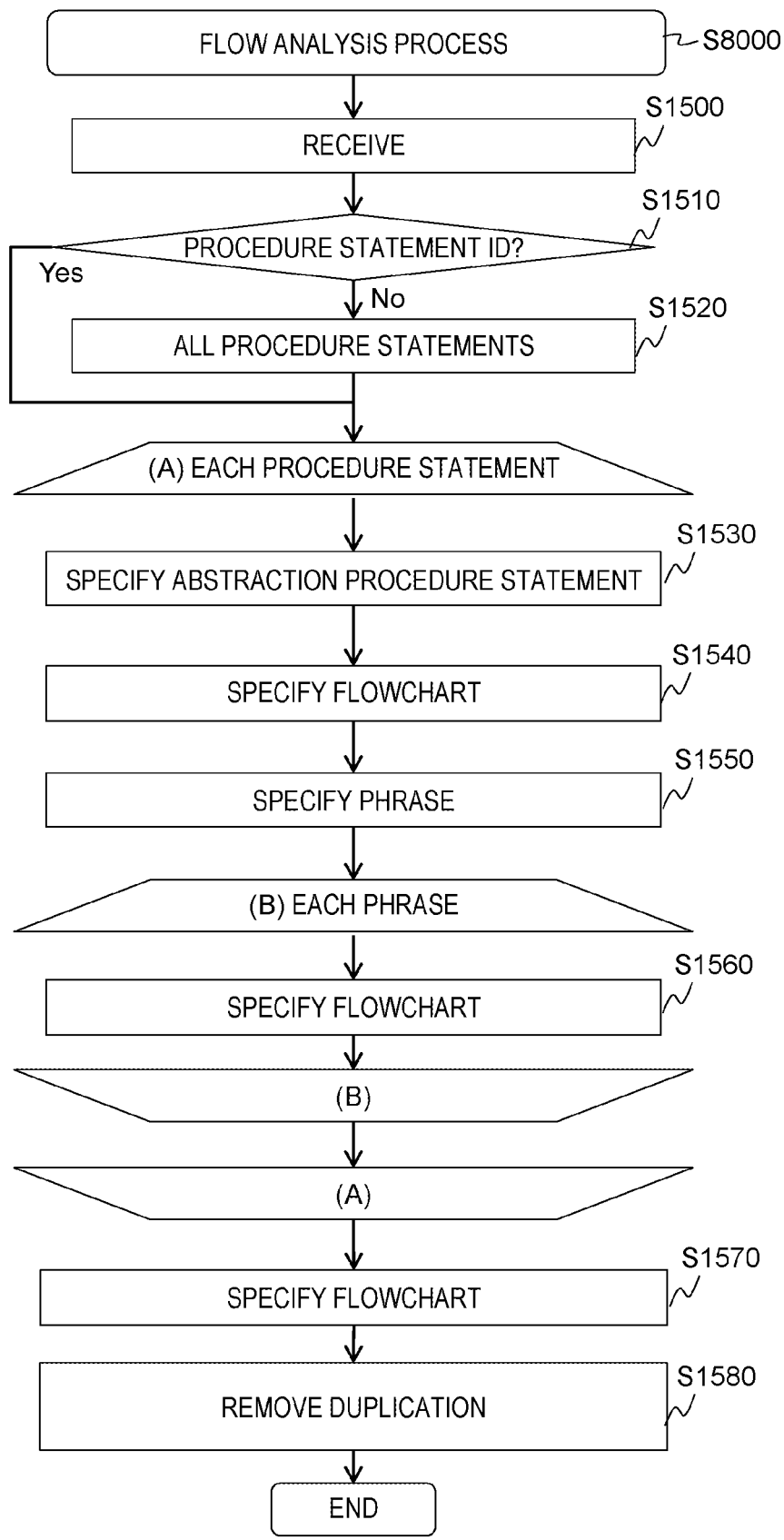
FIG. 26 illustrates a flow decomposition process according to the embodiment.

FIG. 26 illustrates the flow decomposition process (S8000).

The rule management unit 120 receives a flowchart and a procedure correspondence relationship (S1500). The rule management unit 120 determines whether the procedure correspondence relationship includes a procedure statement (S1510). If a determination result in S1510 is false (S1510: No), the rule management unit 120 refers to the procedure table 1502 to extract IDs of all procedure statements included in the procedure (S1520).

Steps S1530 to S1560 are performed for each procedure statement specified from the procedure correspondence relationship. Hereinafter, one procedure statement will be taken as an example (referred to as a "target procedure statement" in the description of S1530 to S1560).

The rule management unit 120 refers to the procedure table 1511 to specify an abstraction procedure statement corresponding to the target procedure statement (S1530). Then, the rule management unit 120 specifies a flowchart portion (a node in a flowchart) corresponding to a condition type or an action type included in the specified abstraction procedure statement out of the received flowchart (S1540). At that time, the rule management unit 120 removes a node of a conditional clause and an action that does not correspond to the specified abstraction procedure statement from the received flowchart. As a result, a partial flowchart is created.

Next, the rule management unit 120 refers to the abstraction procedure pattern table 1506 and the abstraction procedure identical part table 1507 to specify all phrases included in the abstraction procedure statement (S1550). S1560 is performed for each specified phrase. Hereafter, one phrase will be taken as an example (referred to as a "target phrase" in the description of S1560).

The rule management unit 120 specifies a flowchart corresponding to the target phrase from the received flowchart (S1560), which is similar to S1540.

After performing S1530 to S1560, the rule management unit 120 specifies a flowchart corresponding to the entire abstraction procedure from the received flowchart (S1570), which is similar to S1540.

The rule management unit 120 specifies a correspondence relationship of the specified flowchart to match with correspondence relationships of a procedure, a procedure statement, an abstraction procedure, an abstraction procedure statement, and a phrase, and removes the duplication of the flowchart (S1580). Then, the rule management unit 120 returns the specified flowchart, the correspondence relationship between the flowchart and the procedure portion, and a result of excluding the deduplication between the flowcharts.

Figure 27:
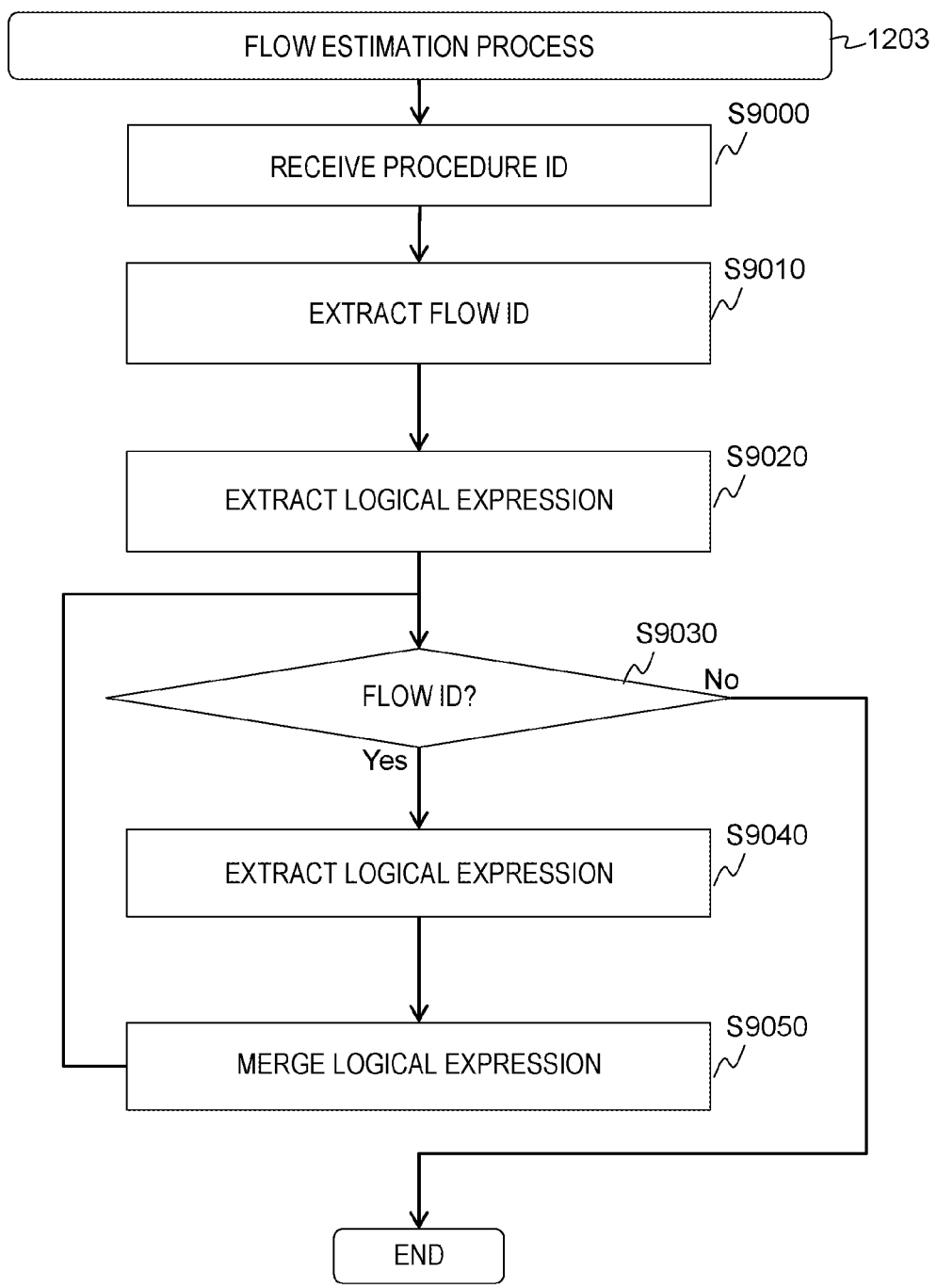
FIG. 27 illustrates a flow estimation process according to the embodiment.

FIG. 27 illustrates the flow estimation process 1203.

The rule management unit 120 receives a procedure ID of a selected procedure (S9000) and first refers to the procedure flow correspondence table 1509 to specify the flow ID 15097 corresponding to the received procedure ID (S9010). Thereafter, the rule management unit 120 refers to the flow table 1508 to specify the logical expression 15081 corresponding to the specified flow ID 15097 (hereinafter referred to as a flowchart as a representative example in the description of FIG. 27) (S9020).

Next, the rule management unit 120 determines whether the flow ID is included in the specified flowchart (S9030).

If a determination result in S9030 is true (S9030: Yes), the rule management unit 120 extracts a flowchart corresponding to the included flow ID from the flow table 1508 (S9040), and generates one flowchart by merging the extracted flowchart into the flowchart specified in S9020 (S9050).

On the other hand, if the determination result in S9030 is false (S9030: No), the rule management unit 120 returns the flowchart (the flowchart generated in S9050 or the flowchart specified in S9020).

Hereinafter, an example of transition of the flow editor screen 60 will be described with reference to FIGS. 28 to 32. Incidentally, a procedure of a procedure ID "M" (M is a natural number) will be referred to as "Procedure M" in the following description. An abstraction procedure of an abstraction procedure ID "N" (N is a natural number) will be referred to as "Abstraction Procedure N". A flowchart of a flow ID "P" (P is a natural number) will be referred to as "Flowchart P". Further, display control of the flow editor screen 60 is performed by at least one of the flow editor 220 and the rule management unit 120 (specifically, for example, performed by the flow editor 220 based on information received from the rule management unit 120 in response to a request from the flow editor 220). Hereinafter, it is assumed that display control of the flow editor screen 60 is performed by the rule management unit 120 through the flow editor 220 in order to simplify the description. Incidentally, the display control may be performed as the flow editor 220 refers to various tables managed by the management server 100.

Figure 28:
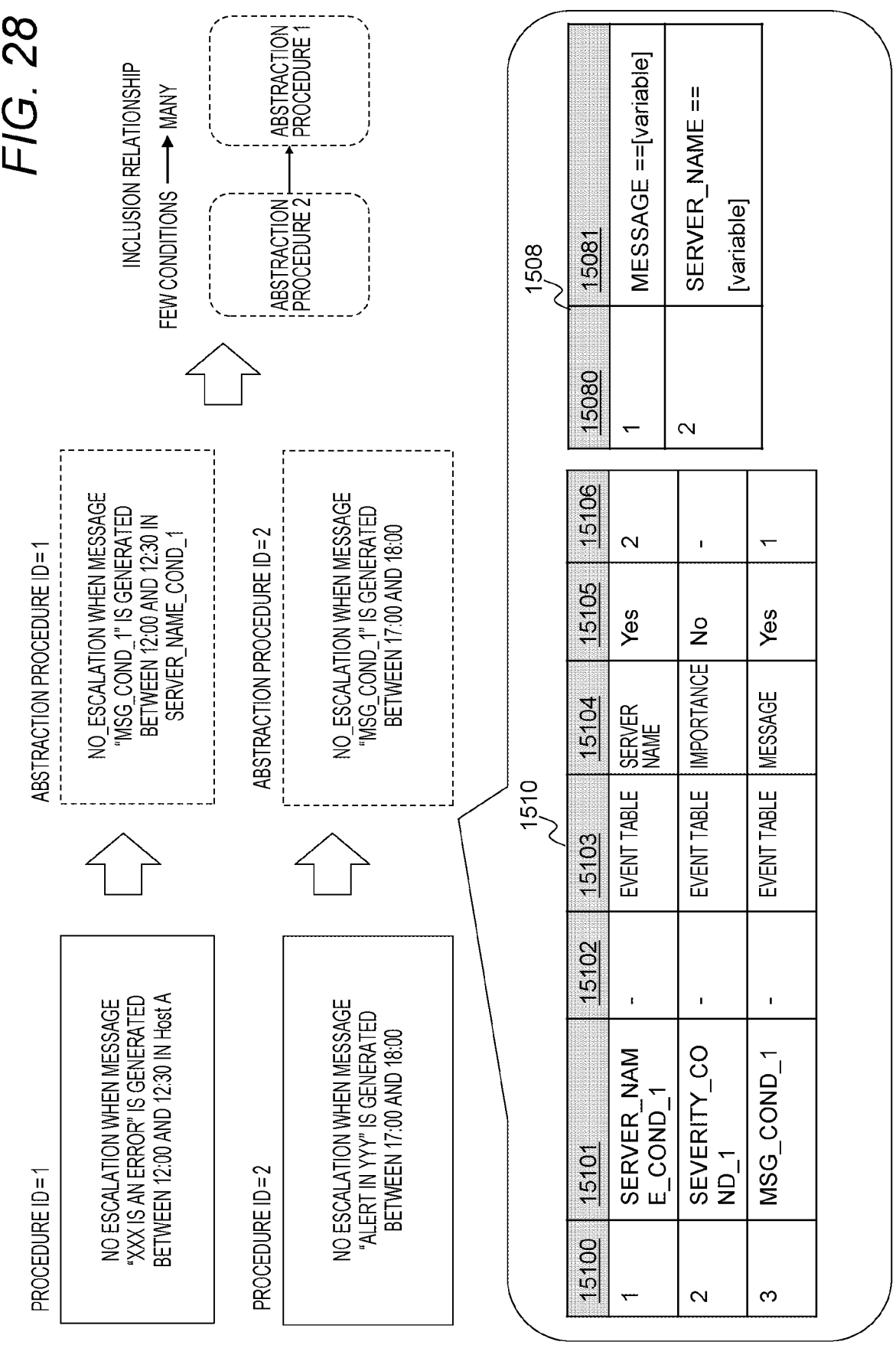
FIG. 28 illustrates a premise which is one specific example according to the embodiment.

It is assumed that there are Procedures 1 and 2 illustrated in FIG. 28. The rule management unit 120 obtains Abstraction Procedures 1 and 2 through S1010 to S1030 for Procedures 1 and 2. Specifically, for example, the following description is given.

"Host A" in Procedure 1 is abstracted to a condition type of "SERVER_NAME_COND_1" in Abstraction Procedure 1. This is because "Host A" is determined to correspond to a server name (exist in "server name" in the acquisition source column 15104), and hence, the condition type 15101 of "SERVER-NAME-COND-1" is estimated.

""XXX is in error"" in Procedure 1 is abstracted to a condition type of "MSG_COND_1" in Abstraction Procedure 1. This is because ""XXX is in error"" in Procedure 1 is determined to correspond to a message (exist in "message" in the acquisition source column 15104), and hence, the condition type 15101 of "MSG_COND-1" is estimated.

"Escalation is not performed" in Procedure 1 is abstracted to an action type of "NO ESCALATION" in Abstraction Procedure 1. This is because "Escalation is not performed" in Procedure 1 corresponds to the action expression 15112 of "Escalation is not performed".

Further, the rule management unit 120 specifies that Abstraction Procedures 1 and 2 are in an inclusion relationship through S1010 to S1030 for Abstraction Procedures 1 and 2 as illustrated in FIG. 28. Specifically, Abstraction Procedure 2 is a parent abstraction procedure of Abstraction Procedure 1. This is because Abstraction Procedure 2 has fewer conditions (condition nodes) than Abstraction Procedure 1.

Further, Flowchart 2 is associated with the condition type 15101 of "SERVER_NAME_COND_1", and Flowchart 1 is associated with the condition type 15101 of "MSG_COND_1" as illustrated in FIG. 28. Both Flowcharts 2 and 1 are logical expressions of conditional clauses.

Figure 29:
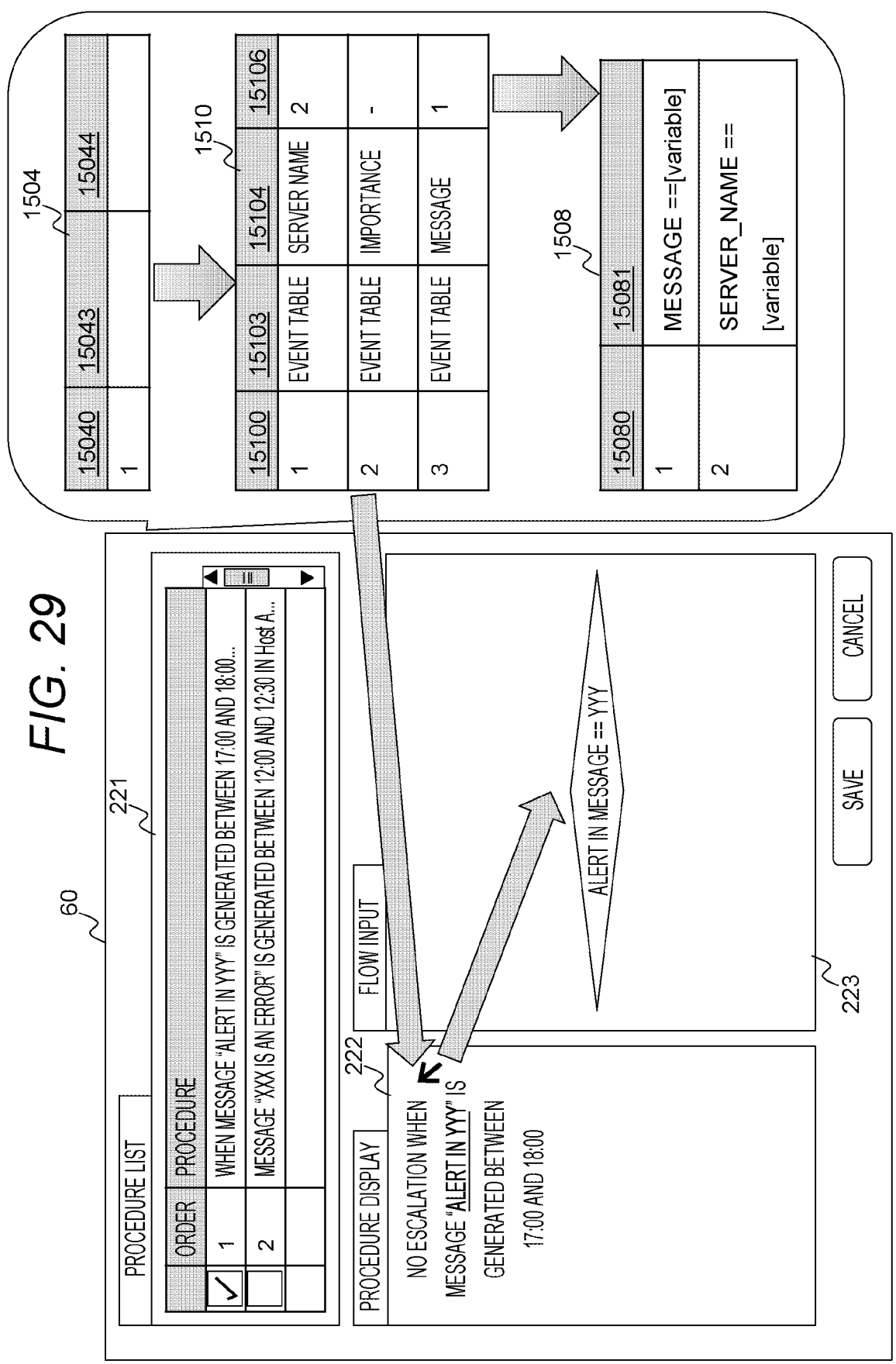
FIG. 29 illustrates a first part of a transition example of a flow editor screen according to the embodiment.

According to the example of FIG. 28, a conversion order of Procedure 2 is prior to a conversion order of Procedure 1 in the procedure list 221 as illustrated in FIG. 29. Specifically, the order (conversion order) of Procedure 2 is "1", and the order of Procedure 1 is "2". This is because Abstraction Procedure 2 is the parent abstraction procedure of Abstraction Procedure 1.

Figure 30:
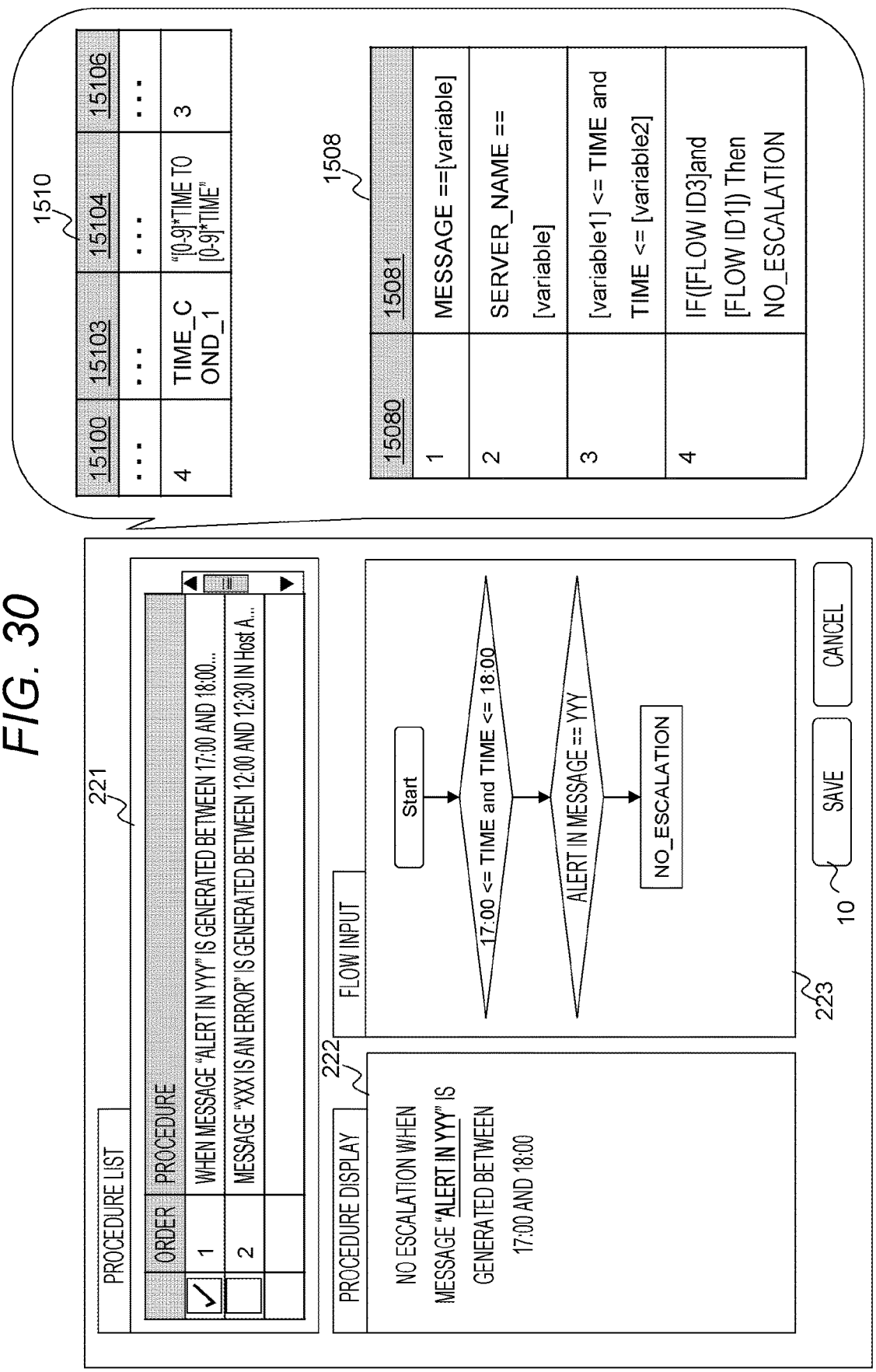
FIG. 30 illustrates a second part of the transition example of the flow editor screen according to the embodiment.

First, it is assumed that the operation manager selects Procedure 2 of the order "1" as illustrated in FIG. 29. In this case, the rule management unit 120 displays Procedure 2 on the procedure display 222 and displays the estimated Flowchart 1 and Flowchart 4 corresponding to the selected Procedure 2 on the flow input 223 (incidentally, a logical expression of Flowchart 4 exemplified in FIG. 30 is a logical expression after manual addition which will be described later) as illustrated in FIGS. 29 and 30. When the display of Flowchart 1 is taken as an example, the following description is given. That is, the rule management unit 120 specifies Abstraction Procedure 2 corresponding to the selected Procedure 2. The rule management unit 120 specifies the condition type ID 15043 corresponding to Abstraction Procedure 2 from the abstraction procedure table 1504. The rule management unit 120 specifies the flow ID 15106 corresponding to the specified condition type ID 15043 from the condition management type table 1510. The rule management unit 120 specifies the logical expression 15081 corresponding to the specified flow ID 15106 from the flow table 1508 and displays Flowchart 1 (node) representing the specified logical expression 15081 on the flow input 223. At that time, the rule management unit 120 substitutes [variable] (parameter) in the logical expression 15081 with a parameter value of "alert in YYY" specified from Procedure 2. As a result, a node (flowchart) having an expression "MESSAGE=YYY alert" is displayed on the flow input 223.

Thereafter, it is assumed that the operation manager inputs an expression "17:00<=TIME and TIME<=18:00" obtained by abstracting a non-abstracted part of "between 17:00 and 18:00" in Procedure 2 to the flow input 223 and issues the save instruction (for example, clicks a "save" button 10) as illustrated in FIG. 30. Since there is no condition type corresponding to the expression in the condition type table 1510, the rule management unit 120 adds an entry including the condition type 15101 of "TIME_COND-1" and a condition value corresponding to the expression to the condition type table 1510. Further, the rule management unit 120 adds Flowchart 3 (logical expression) corresponding to the expression to the flow table 1508. Further, the rule management unit 120 updates Flowchart 4 (logical expression) corresponding to an action type. Further, the rule management unit 120 may perform the similarity relationship extraction process, the inclusion relationship estimation process, and the procedure conversion order determination process and update a procedure list (an alignment order of procedures) on the flow editor screen.

Figure 31:
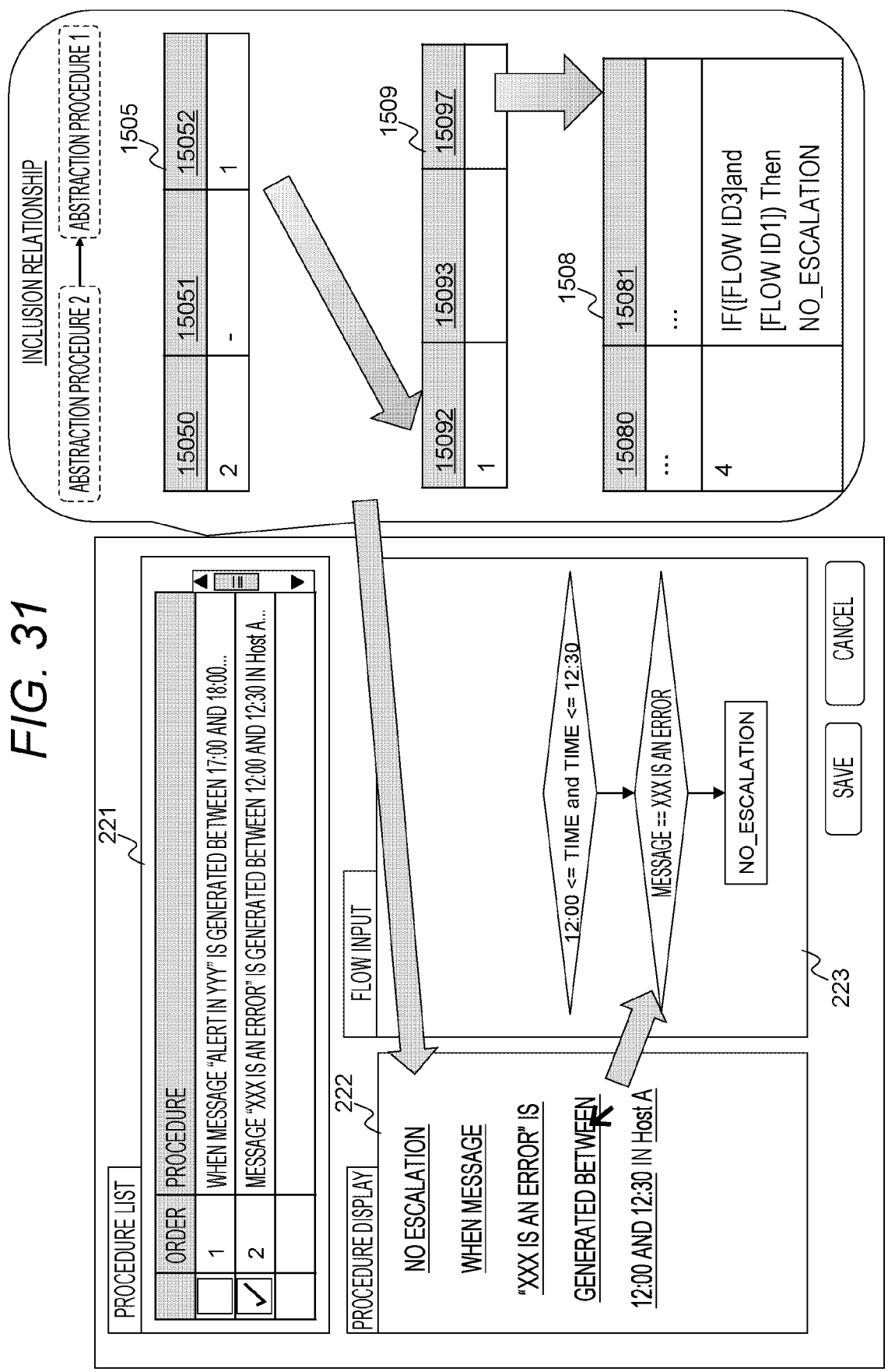
FIG. 31 illustrates a third part of the transition example of the flow editor screen according to the embodiment.

Next, it is assumed that the operation manager selects Procedure 1 of the order "2" as illustrated in FIG. 31. In this case, the rule management unit 120 displays Procedure 1 on the procedure display 222 and displays estimated Flowcharts 1, 3 and corresponding to the parent Abstraction Procedure 2 of Abstraction Procedure 1 on the flow input 223 as illustrated in FIG. 31. At this time, the rule management unit 120 substitutes [variable] in Flowchart 1 with a parameter value of "XXX is an error" specified from Procedure 1 (a parameter value corresponding to a condition type corresponding to Flowchart 1) Further, the rule management unit 120 substitutes [variable] in Flowchart 3 with parameter values of "12:00" and "12:30" (parameter values corresponding to the condition type corresponding to Flowchart 3) specified from Procedure 1.

Further, the rule management unit 120 displays Flowchart 2 corresponding to the condition type of "SERVER_NAME-_COND-1" not included in Abstraction Procedure 2 among condition types corresponding to Abstraction Procedure 1 on the flow input 223 as illustrated in FIG. 32. At this time, the rule management unit 120 substitutes [variable] in Flowchart 2 (logical expression) with a parameter value of "Host A" specified from Procedure 1 (a parameter value corresponding to the condition type "SERVER_NAME_COND_1").

As illustrated in FIG. 32, the operation manager completes a flowchart corresponding to Procedure 1 by manually connecting nodes (for example, connecting the nodes with an arrow).

According to FIG. 31 and FIG. 32, substantially, the operation manager does not need to manually add or edit a flowchart for Procedure 1 corresponding to the child Abstraction Procedure 1 of Abstraction Procedure 2 (for Procedure 1, which is set to the order next to Procedure 2 corresponding to the registered flowchart). When determining that the flowchart for Procedure 1 is correct as the estimated flowchart (flowchart illustrated in FIG. 32), the operation manager issues the save instruction. In this case, the rule management unit 120 adds a new Flowchart 5 (a new logical expression including the flow ID "2") corresponding to an action type to the flow table 1508.

Although one embodiment has been described above, this is an example for describing the invention, and there is no intention to limit the scope of the invention only to the embodiment. The invention can be implemented in various other forms.

For example, another method such as deep learning may be adopted instead of the morphological analysis.

Further, for example, when a value in the configuration information 170 indicating a configuration of the target system 300 is similar to a word included in at least one of the first abstraction procedure (abstraction procedure corresponding to the first procedure) and the second abstraction procedure (abstraction procedure corresponding to the second procedure), the rule management unit 120 may estimate a condition type for the word based on the value in the configuration information 170.

Further, for example, when a value in the monitoring information 160 indicating a monitoring result of the target system 300 is similar to a word included in at least one of the first abstraction procedure (abstraction procedure corresponding to the first procedure) and the second abstraction procedure (abstraction procedure corresponding to the second procedure), the rule management unit 120 may estimate a condition type for the word based on the value in the monitoring information 160.

Further, for example, the flow editor 220 (or the rule management unit 120) may set the order of the second procedure corresponding to the second abstraction procedure included in the first abstraction procedure to be prior to the order of the first procedure corresponding to the first abstraction procedure in the procedure list 221. Further, for example, when the second abstraction procedure is also included in a third abstraction procedure corresponding to a third procedure in the procedure manual 1501 (the plurality of procedures) and the first abstraction procedure and the third abstraction procedure are not in the inclusion relationship, the flow editor 220 (or the rule management unit 120) may set a procedure corresponding to an abstraction procedure having a smaller number of condition types between the first abstraction procedure and the third abstraction procedure to be prior in the order between the first abstraction procedure and the third abstraction procedure in the procedure list 221. With the conversion of the procedure to the flowchart along such an order, it is expected to reduce the burden of input work performed by the operation manager.

REFERENCE SIGNS LIST 100 management server
200 management client
300 target system

The invention claimed is:

1. An operation assistance system comprising:
an interface unit including one or more interface devices;
a storage unit including one or more memories; and
a processor unit which is one or more processors connected to the interface unit and the storage unit,
wherein the processor unit
receives a plurality of procedures relating to a target system to be monitored,
abstracts the plurality of procedures into a plurality of abstracted procedures based on word-string patterns that are common in the plurality of procedures, wherein each of the plurality of abstracted procedures is associated with a word-string similarity,
clusters the plurality of abstracted procedures based on similarity,
estimates one or more inclusion relationships between two or more of the plurality of abstracted procedures in a single cluster, wherein the one or more inclusion relationships comprise an indication that a first one of the plurality of abstracted procedures includes a second one of the plurality of abstracted procedures,
receives selection of a first one of the plurality of procedures,
matches the first procedure to the first abstracted procedure based on the word-string pattern associated with the first abstracted procedure,
estimates a structure that represents the first procedure based on a stored structure that is associated with the second abstracted procedure that us included in the first abstracted procedure, and
displays a flowchart representation of the estimated structure.

2. The operation assistance system according to claim 1, wherein each of the plurality of procedures includes one or more natural-language sentences.

3. The operation assistance system according to claim 2, wherein the stored structure comprises a logical expression including a parameter, and wherein the estimated structure comprises a logical expression obtained by substituting the parameter of the stored structure with a parameter value in the first procedure.

4. The operation assistance system according to claim 1, wherein estimating one or more inclusion relationships comprises generating the indication that the first abstracted procedure includes the second abstracted procedure because the first abstracted procedure includes all conditions in the second abstracted procedure and the second abstracted procedure includes fewer conditions than the first abstracted procedure.

5. The operation assistance system according to claim 4, wherein when a value in configuration information indicating a configuration of the target system and a word included in at least one of the first abstracted procedure and the second abstracted procedure are similar, the processor unit estimates a condition type for the word based on the value in the configuration information.

6. The operation assistance system according to claim 4, wherein when a value in monitoring information relating to a monitoring result of the target system and a word included in at least one of the first abstracted procedure and the second abstracted procedure are similar, the processor unit estimates a condition type for the word based on the value in the monitoring information.

7. The operation assistance system according to claim 1, wherein the processor unit displays a procedure list comprising the plurality of procedures in an order, such that a second procedure from which the second abstracted procedure was derived is ordered prior to the first procedure.

8. The operation assistance system according to claim 7, wherein the procedure list is ordered such that procedures with fewer conditions are ordered prior to procedures with more conditions.

9. An operation assistance method comprising:
   receiving a plurality of procedures relating to a target system to be monitored;
   abstracting the plurality of procedures into a plurality of abstracted procedures based on word-string patterns that are common in the plurality of procedures, wherein each of the plurality of abstracted procedures is associated with a word-string pattern;
   clustering the plurality of abstracted procedures based on similarity;
   estimating one or more inclusion relationships between two or more of the plurality of abstracted procedures in a single cluster, wherein the one or more inclusion relationships comprise an indication that a first one of the plurality of abstracted procedures includes a second one of the plurality of abstracted procedures;
   receiving selection of a first one of the plurality of procedures;
   matching the first procedure to the first abstracted procedure based on the word-string pattern associated with the first abstracted procedure;
   estimating a structure that represents the first procedure based on a stored structure that is associated with the second abstracted procedure that is included in the first abstracted procedure; and
   displaying a flowchart representation of the estimated structure.

10. A computer program that causes one or more computers to execute:
    receiving a plurality of procedures relating to a target system to be monitored,
    abstracting the plurality of procedures into a plurality of abstracted procedures based on word-string patterns that are common in the plurality of procedures, wherein each of the plurality of abstracted procedures is associated with a word-string pattern;
    clustering the plurality of abstracted procedures based on similarity,
    estimating one or more inclusion relationships between two or more of the plurality of abstracted procedures in a single cluster, wherein the one or more inclusion relationships comprise an indication that a first one of the plurality of abstracted procedures includes a second one of the plurality of abstracted procedures;
    receiving selectin of a first one of the plurality of procedures;
    matching the first procedure to the first abstracted procedure based on the word-string pattern associated with the first abstracted procedure;
    estimating a structure that represents the first procedure based on a stored structure that is associated with the second abstracted procedure that is included in the first abstracted procedure; and
    displaying a flowchart representation of the estimated structure.

* * * * *